(12) United States Patent
Benedict et al.

(10) Patent No.: US 8,651,790 B2
(45) Date of Patent: Feb. 18, 2014

(54) WAREHOUSE STORAGE SYSTEM

(76) Inventors: Charles E. Benedict, Tallahassee, FL (US); Brian G. Pfeifer, Tallahassee, FL (US); Christian A. Yates, Tallahassee, FL (US); Scott K. Bladen, Bristol, FL (US); Richard E. Lackinger, Tallahassee, FL (US); James R. Dobbs, Tallahassee, FL (US)

( * ) Notice: Subject to any disclaimer, the term of this patent is extended or adjusted under 35 U.S.C. 154(b) by 865 days.

(21) Appl. No.: 11/743,585

(22) Filed: May 2, 2007

(65) Prior Publication Data

US 2008/0075569 A1  Mar. 27, 2008

Related U.S. Application Data

(60) Provisional application No. 60/826,868, filed on Sep. 25, 2006.

(51) Int. Cl.
 *B65G 1/00* (2006.01)
(52) U.S. Cl.
 USPC ............ 414/273; 414/411; 414/217; 414/940
(58) Field of Classification Search
 USPC ...................... 414/411, 217, 331.02, 940, 273
 See application file for complete search history.

(56) References Cited

U.S. PATENT DOCUMENTS

| | | | |
|---|---|---|---|
| 2,440,307 A | 4/1948 | Smith | |
| 2,963,310 A | 12/1960 | Abolins | |
| 3,220,571 A | 11/1965 | Kummerman | |
| 3,252,603 A | 5/1966 | Davis | |
| 3,498,477 A | 3/1970 | Sommer | |
| 3,513,999 A | 5/1970 | Graham et al. | |
| 3,558,176 A | 1/1971 | Fathauer et al. | |
| 3,604,743 A | 9/1971 | Kinkopf | |
| 3,687,309 A | 8/1972 | Macrander | |
| 3,730,358 A * | 5/1973 | Oji | 211/1.57 |
| 3,779,403 A * | 12/1973 | Young | 414/279 |
| 4,043,285 A | 8/1977 | Nordstrom | |
| 4,158,416 A | 6/1979 | Podesta | |
| 4,172,685 A | 10/1979 | Nabeshima et al. | |
| 4,666,356 A | 5/1987 | Newbury | |
| 4,973,219 A | 11/1990 | Brickner et al. | |
| 5,314,262 A | 5/1994 | Meisinger et al. | |
| 5,354,112 A | 10/1994 | Hara et al. | |
| 5,540,532 A | 7/1996 | Carder et al. | |
| 5,560,663 A | 10/1996 | Hara et al. | |
| 5,769,589 A | 6/1998 | Lubbers | |

(Continued)

FOREIGN PATENT DOCUMENTS

| | | |
|---|---|---|
| DE | 3103162 | 8/1982 |
| EP | 0365086 | 10/1989 |

(Continued)

*Primary Examiner* — Saul Rodriguez
*Assistant Examiner* — Willie Berry, Jr.

(57) ABSTRACT

A system and method for the safe storage of items wherein a storage structure is provided having a first section in which storage units are stored in vertically oriented cells with each storage unit being stacked one upon another and wherein at least one transfer vehicle is provided for selectively engaging and conveying the storage units along an overhead grid track system between the first section and a second section wherein the at least one transfer vehicle may be used to either lift or lower a storage unit and move the storage unit to and from a storage position in one of the vertical storage cells of the first section of the storage structure.

16 Claims, 25 Drawing Sheets

(56) References Cited

U.S. PATENT DOCUMENTS

| | | |
|---|---|---|
| 5,915,906 A | 6/1999 | Lucking et al. |
| 6,161,887 A | 12/2000 | Shiota et al. |
| 6,220,173 B1 | 4/2001 | Sauerwein |
| 6,572,319 B1 | 6/2003 | Simmons, III et al. |
| 6,726,429 B2 * | 4/2004 | Sackett et al. ............ 414/217 |
| 2004/0234364 A1 | 11/2004 | Ehrenleitner et al. |
| 2005/0047895 A1 | 3/2005 | Lert, Jr. |
| 2005/0220573 A1 | 10/2005 | Benedict et al. |
| 2005/0220600 A1 * | 10/2005 | Baker et al. ............ 414/626 |

FOREIGN PATENT DOCUMENTS

| | | |
|---|---|---|
| JP | 59-134274 A | 8/1984 |
| JP | 60093006 | 5/1985 |
| JP | 61114905 | 6/1986 |
| JP | 64-024090 U | 9/1989 |
| JP | 07172317 | 7/1995 |

* cited by examiner

WAREHOUSE STORAGE SYSTEM

CROSS-REFERENCE TO RELATED APPLICATIONS

This application claims priority to U.S. provisional application No. 60/826,868, filed on Sep. 25, 2006, entitled "Warehouse Storage System," which is hereby incorporated by reference in its entirety.

BACKGROUND OF THE INVENTION

1. Field of the Invention

This application is directed to a warehouse storage system wherein storage units are manipulated by one or more overhead transfer units that can lift or elevate the storage units and maneuver them into vertically oriented storage cells or into vertical stacks without the need to use conventional cranes and forklifts and in such a manner as to maximize storage space by eliminating the need for internal aisles for manipulating and/or handling equipment.

2. Brief Description of the Related Art

Storage space is often an issue for many people and businesses. Whether it be people living in small urban units, such as apartments and condominiums, people downsizing to smaller homes, such as for retirement, or businesses generating stacks of papers and files, storage solutions are in demand. As a result, offsite storage facilities have been increasingly popular.

Conventional storage facilities typically include a plurality of individual storage units, such as garages, rooms, or lockers, that are housed by a static structure, such as a one-story building, multi-story building, or a warehouse. These facilities are built to allow access to the unit via a doorway opening. In order to use the facility, a customer must be able to transport the items to be stored to the doorway opening via driveways, hallways, stairways, elevators, or the like. As a result, a customer often has to rent trailers, trucks, vans or other vehicles to transport the items to be stored at the storage facility. Further, the customer may have to seek assistance in packing or loading the items to be stored.

Another drawback of conventional storage facilities is "dead space." Due to the necessary means for accessing the doorway openings of the storage units, storage facilities have a lot of "dead space" that is taken up by aisles, driveways, and hallways, and not used for storage.

In an attempt to mitigate against some of the problems associated with conventional offsite storage facilities, other forms of storage have been developed, including storage containers that are delivered to a location designated by a customer. The customer then loads the items to be stored in these containers, and the containers are picked up and stored in an offsite facility. While this type of storage system eliminates the hassles associated with transporting the items to be stored to a storage facility, these systems still suffer from "dead space" and therefore do not maximize storage space. After the storage containers are loaded, picked up from the customer's location, and delivered to an offsite facility, heavy equipment such as, fork lifts, cranes, vehicles, and the like are used to move the containers into storage areas. The use of this heavy equipment requires a large amount of "dead space," such as aisles, to enable the storage containers to be moved.

Since conventional storage systems and facilities suffer from "dead space," there is a need for a storage system that maximizes storage space.

SUMMARY

The present invention is directed to a warehouse storage system that maximizes storage space by reducing the number of aisles, hallways, and other areas of non-storage space. The warehouse storage system includes a plurality of storage units that are manipulated by one or more overhead transfer units. The overhead transfer units lift the storage units and maneuver them into vertically oriented storage cells or into vertical stacks without the need to use conventional cranes and forklifts and in such a manner as to maximize storage space by eliminating the need for internal aisles for manipulating and/or handling equipment. Thus, the warehouse storage system of the present invention stores individual storage containers with an X-Y-Z storage matrix, where X is a side-to-side direction, Y is a front-to-back direction, and Z is a top-to-bottom direction.

BRIEF DESCRIPTION OF THE DRAWINGS

A better understanding of the invention will be had with reference to the attached drawings wherein.

DETAILED DESCRIPTION OF THE PREFERRED EMBODIMENTS

Figure 1:
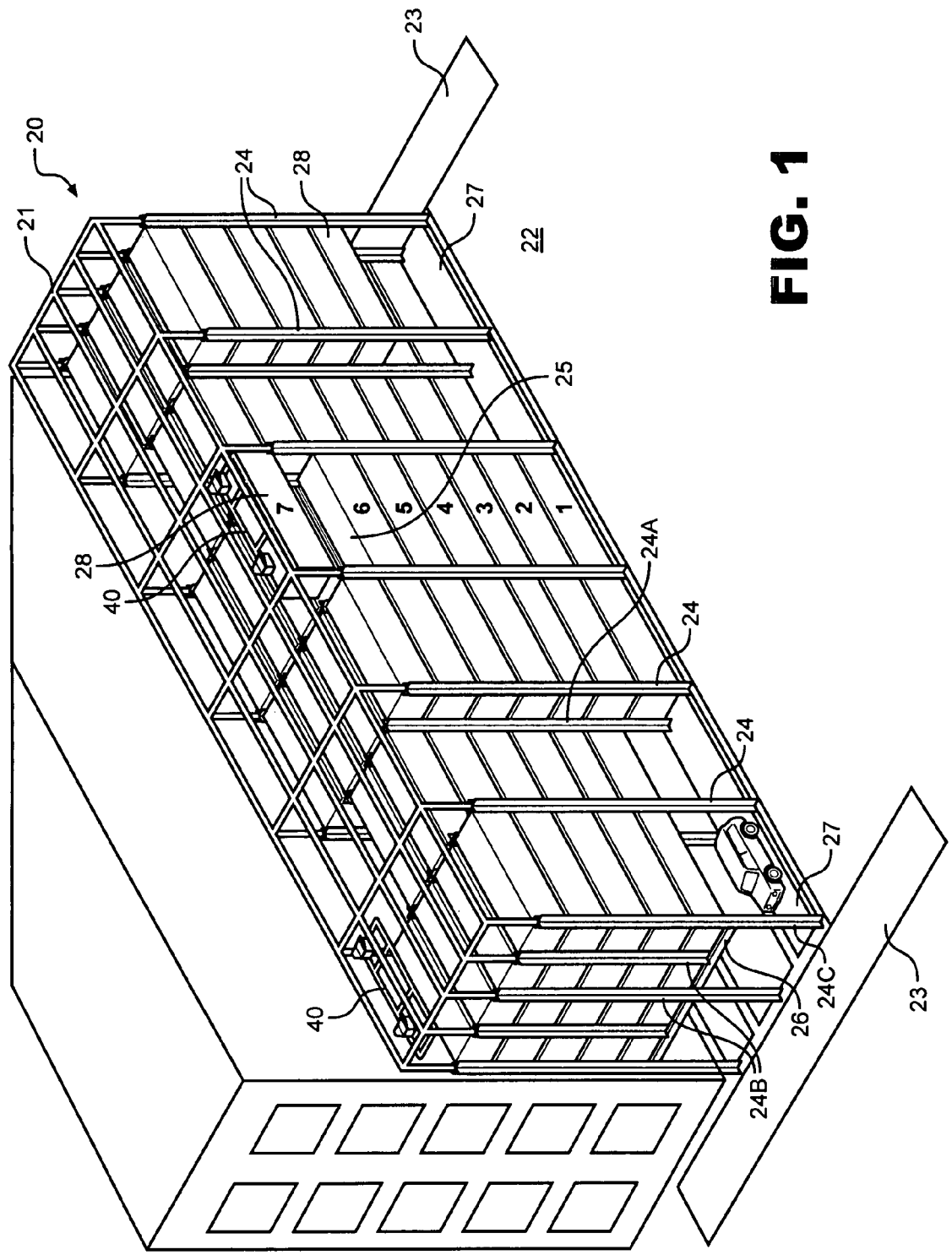
FIG. 1 is a perspective view of a first embodiment of a warehouse storage facility in accordance with the teachings of the present invention illustrating a retrieval of a storage unit from a bottom of a vertical stack of storage units.

The present invention is directed to warehouse storage facilities and methods for safely and efficiently maximizing storage space. The facilities of the invention are designed and configured to permit a maximum number of storage units to be stored within a given warehouse space and yet easily accessible when their contents are needed. The warehouse facilities described herein are generally fully enclosed structures, each having outer side walls and roof that protect the storage units being stored from ambient weather conditions with the roof being cut away and walls being removed to facilitate the description of the storage systems.

With specific reference to FIGS. 1-19, a first embodiment of warehouse storage facility will be described. In this embodiment, the warehouse facility includes a large warehouse-like structure 20 that includes an inner portion 21 that is supported on a solid foundation 22 that may be elevated or built up with respect to an adjacent roadway 23 so that stored items can be easily loaded onto or unloaded from trucks or other vehicles. The roadway may be a driveway or parking area.

In a preferred embodiment, the warehouse structure 20 includes a number of spaced columns 24. The spaced columns 24 define a grid made up of a plurality of storage cells 25 so that individual storage units 28 may be stored in stacked vertical relationship relative to one another. One row and one column of this grid are always open so as to permit the retrieval of storage units 28 from their storage positions.

The columns 24 may have cross sections defined by one or more vertical guide flanges that are oriented at generally right angles relative to one another so that the storage units 28 are guidingly engageable therewith. Although each column may have the same cross section, inner columns 24A will preferably have "+" shaped cross sections so as to define four guide channels. End and side columns 24B will have generally T-shaped cross sections defining two opposing guide channels, and corner columns 24C will have flanges defining a single or L-shaped guide channel. This guidance feature will ensure that the storage units 28 being handled are not accidentally damaged.

Also in the preferred embodiment, the warehouse structure 20 includes a plurality of horizontal beams 26 that extend perpendicularly between the columns 24 and are generally parallel to the solid foundation 22. The horizontal beams 26 support the storage units 28 when they are in storage positions. As shown in FIGS. 1-19, the horizontal beams 26 support the storage units 28 some spaced distance above the solid foundation 22 so as form staging areas 27 where customers can park their vehicles. These staging areas 27 are preferably adjacent to the roadways 23.

Each storage unit 28 is generally an enclosed, rectilinear, box-like container having a top, bottom, and four side walls so that the storage units 28 can easily be vertically stacked upon each other. One of either the end or side walls is openable so as to provide access to the interior of the unit 28. Alternatively, an opening or doors may be provided in one or more of the end or side walls to allow items to be added to or removed from the storage unit 28. Further, the storage units 28 may be made from any durable material, such as plastic, metal, wood, composite materials, or any combination thereof. Moreover, the storage units 28 may be reinforced with other materials, especially if large, heavy items are to be stored therein. It is also preferred that sufficient openings are provided in the enclosed storage unit walls to permit air flow there through so as to provide ventilation.

The storage units 28 are designed to be manipulated by overhead transfer units 40, as shown in detail in FIGS. 19-28, with two such units being shown in FIGS. 1-19. Each carriage includes a body, which in the embodiment shown, includes a rectangular steel frame 42 that is supported at each of the four corners thereof by support or pilot hanger shafts 43 that extend upwardly from the frame and through open slots 44 that are provided in an overhead track system 45. The track system is formed by a plurality of hollow steel box beams 46 that are welded or otherwise secured to steel girders or roofing "I" beams of the structure 20 so that the open slots 44 are oriented downwardly. The track system extends above the periphery of each of the cells 25 of the grid in such a manner that the transfer units 40 may be directly and selectively aligned above the cells 25 so as to place a storage unit 28 into a cell 25 or elevate the storage unit 28 from a cell 25. Load bearing flanges 47 are formed on opposite sides of the slots on which track roller carriages 48 are movably supported. Each of the pilot hanger shafts 43 is centrally secured to a separate roller carriage.

The box beams 46 that form the track system 45 include both longitudinally extending sections 46A and transverse sections 46B that are oriented at generally right angles with respect to one another. The roller carriages include both upper and lower heavy duty roller ball sets 49 and 50, respectively, that guide the carriages within the box beams 46 with the lower set bearing the weight of the transfer units 40 and the storage units 28. Alternatively, the roller carriages can only include a lower heavy duty roller ball set 50 for guiding the carriages within the box beams 46. Each carriage also includes two pair of wheel sets 51 and 52, with the wheel sets 51 engaging the flanges 47 of the longitudinal sections 46A and the wheel sets 52 engaging the flanges 47 of the transverse sections 46B.

Figure 21:
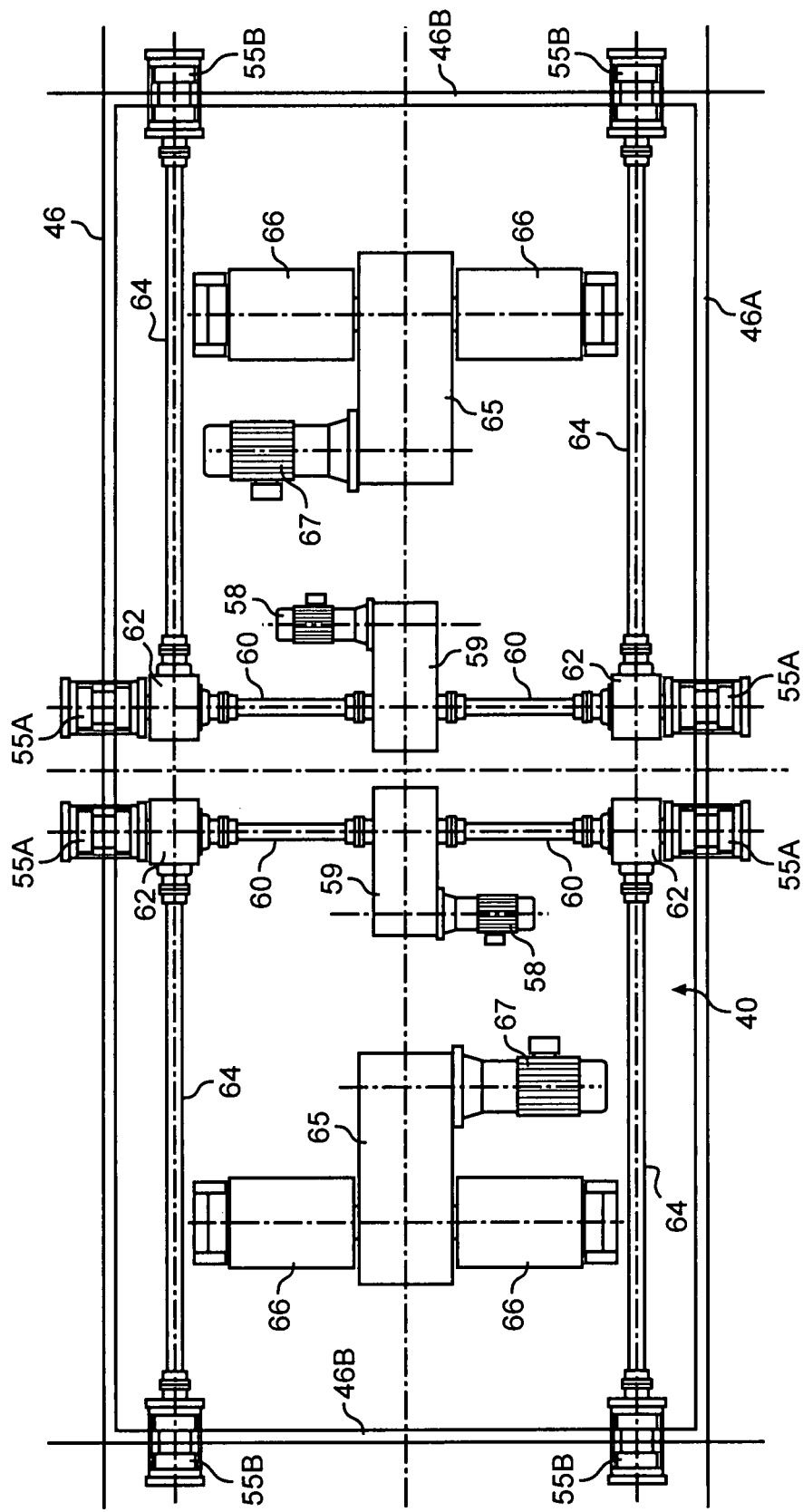
FIG. 21 is a top plan view of the transfer unit of FIG. 20 showing portions of gear racks associated with an overhead guide track system superposed over drive pinions of the transfer unit.
Figure 22:
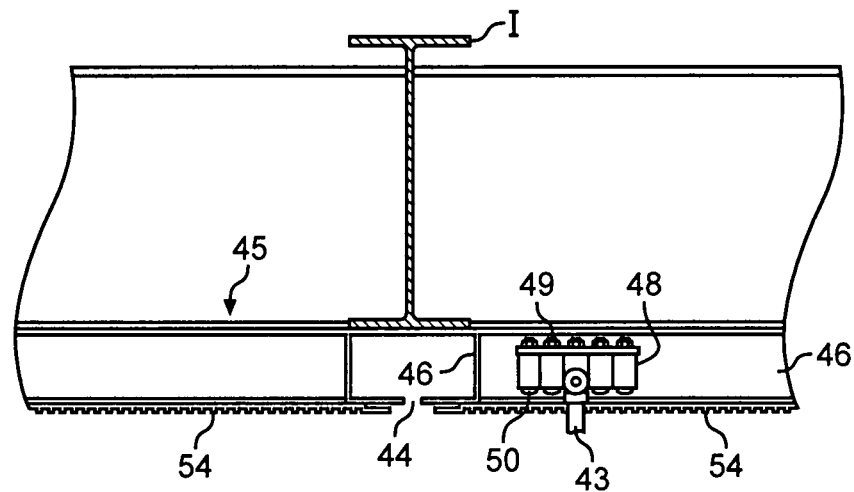
FIG. 22 is a partial cross sectional view through an intersecting section of the overhead tracks of the invention and showing a side view of one of the roller assemblies that support the transfer units of the invention.
Figure 23:
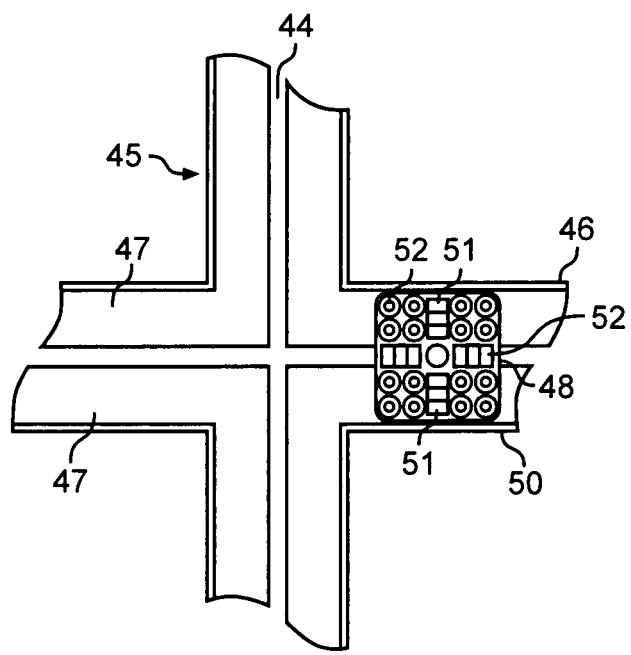
FIG. 23 is a partial top plan view of FIG. 22, showing the intersecting section of the overhead tracks of the invention and one of the roller assemblies that support the transfer units of the invention.
Figure 24:
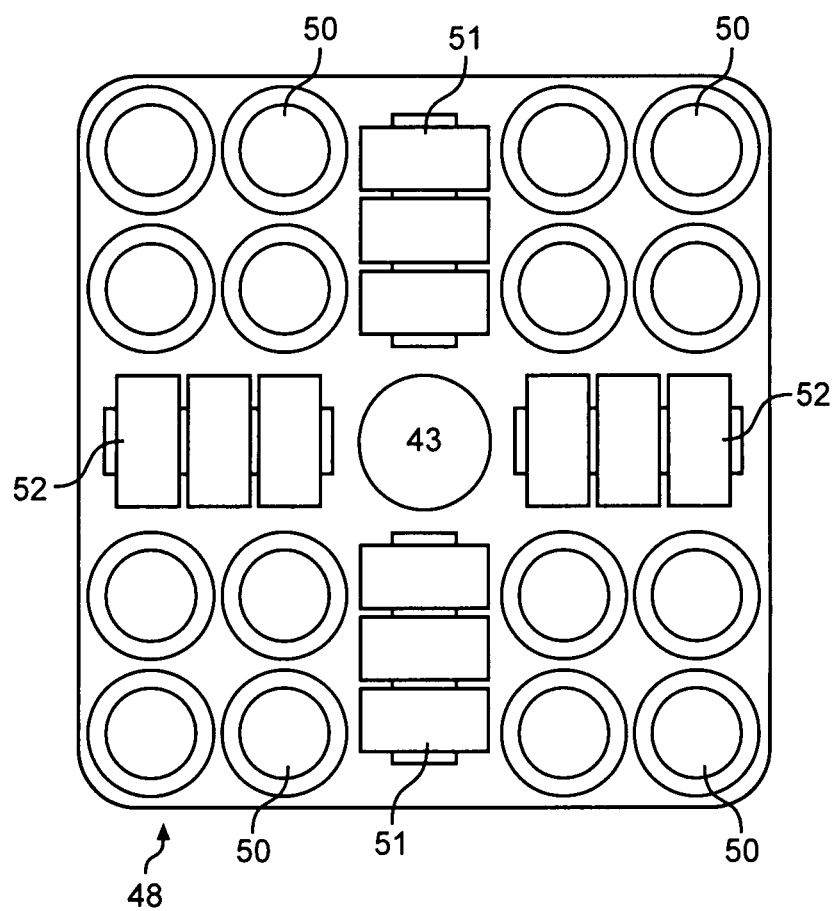
FIG. 24 is a bottom view of one of the roller assemblies of the invention which support the transfer units from the guide tracks.

The lower surfaces of each of the track sections 46A/B are provided with gear racks 54 with which drive pinion gears 55A and 55B of drive assemblies carried by the transfer units 40 are in meshed engagement. With specific reference to FIG. 21, each transfer unit 40 includes eight drive pinion gears 55A/B, two on each side of the frame 42 that are engaged with the gear racks 54. FIG. 21 is a top plan view of the transfer unit 40 showing four gear track sections 46 superimposed over the drive pinion gears 55A/B with two of the sections being the longitudinal track sections 46A and two being the transverse sections 46B. Two drive motors 58 are mounted to the transfer unit 40 having outputs connected through power splitters 59 that drive first output drive shafts 60 that drive the pinion gears 55A through four gear boxes 62. Secondary drive output shafts 64 extend from the gear boxes 62 to the drive pinion gears 55B. In this manner, all the drive pinion gears 55A/B are uniformly driven at the same rate by the two drive motors 58. The gear boxes 62 are controlled such the drive output is only possible to either the pinion gears 55A or 55B at any one time such that to move the transfer unit 40 longitudinally along the track system 46 from the back of the structure 20 toward the front thereof, only the drive pinion gears 55A are powered and such that, when the transfer unit 40 is to move transversely from side-to-side along the track system 46, only the drive pinions 55B are powered.

Figure 25:
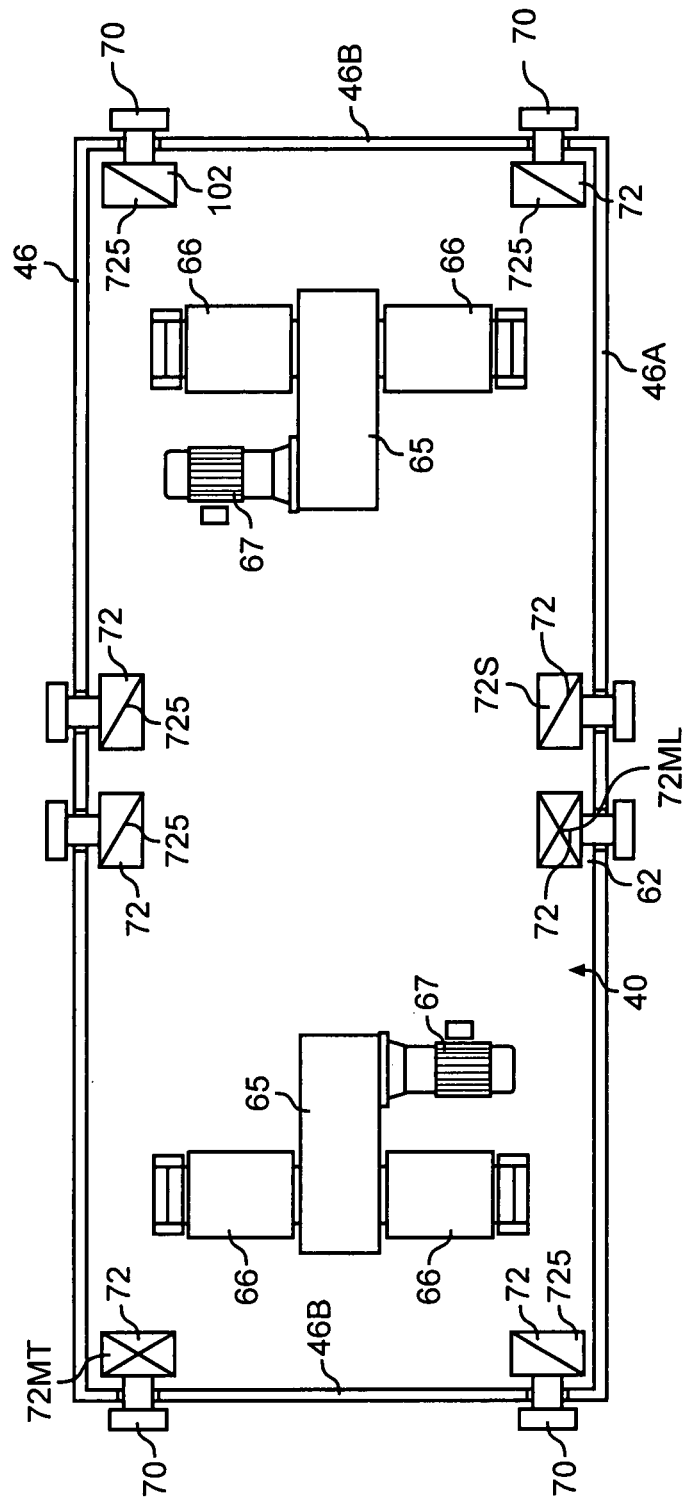
FIG. 25 is a top plan view of an alternative embodiment of the transfer unit of FIG. 12 showing portions of segments of an overhead guide track system superposed over rubber drive wheels of the transfer unit.

In an alternative embodiment shown in FIG. 25, the transfer unit 40 can be provided with rubber drive wheels 70 instead of the gear racks 54 and the drive pinion gears 55A/B. FIG. 25 is a top plan view of the transfer unit 40 showing four gear track sections 46 superimposed over the rubber drive wheels 70 with two of the track sections being the longitudinal track sections 46A and two being the transverse sections 46B. Drive motors 72 are attached to each of the rubber drive wheels 70. The drive motors 72 are controlled by a master encoder 72ML on one of the drive motors 72 along one of the longitudinal track sections 46A and another master encoder 72MT on one of the drive motors 72 along one of the transverse track section 46B. The master controllers 70ML and 70MT control slave encoders 72S on the other drive motors 72. In this manner, the drive motors 70 are controlled such that to move the transfer unit 40 longitudinally along the track system 46 from the front of the structure 20 to the back thereof and vice versa, the master encoder 72ML controls the drive motors 72 along the longitudinal track sections 46A. Likewise, to move the transfer unit 40 transversely along the track system 46 from one side of the structure 20 to the opposite side and vice versa, the master encoder 72MT controls the drive motors 72 along the transverse track sections 46B.

Figure 20:
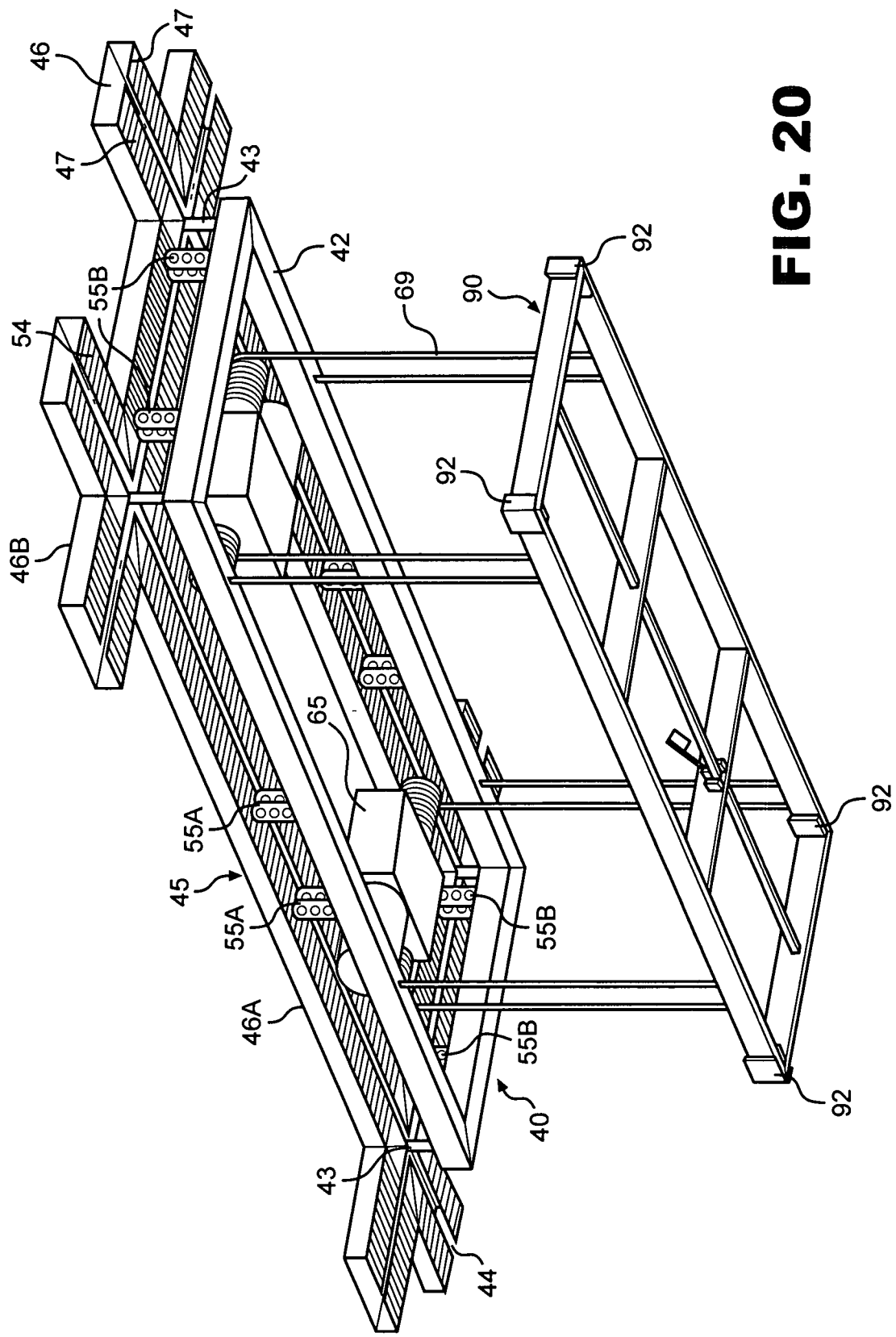
FIG. 20 is a perspective view of one of the transfer units of the invention shown suspended from intersecting sections of overhead tracks along which the transfer units are selectively movable in both "X" and "Y" directions and also illustrating a suspension frame for cooperatively engaging and securing one of the storage units of the invention as the storage units are moved about the system and storage facility of the invention.
Figure 26:
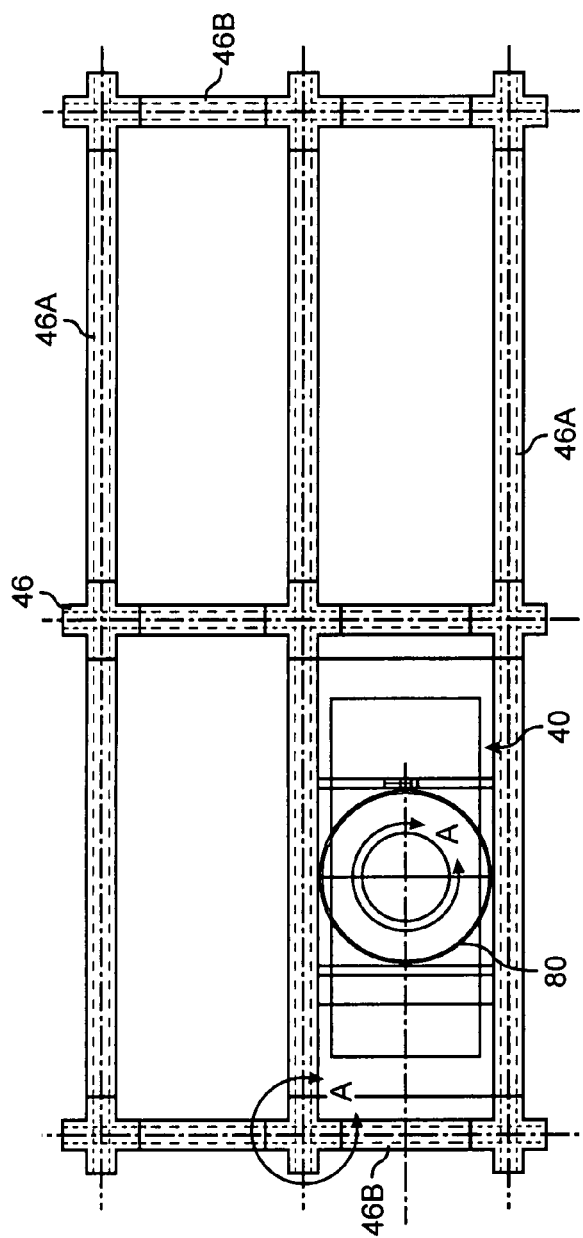
FIG. 26 is a top view showing the transfer unit of FIG. 12 with a trunnion.
Figure 27:
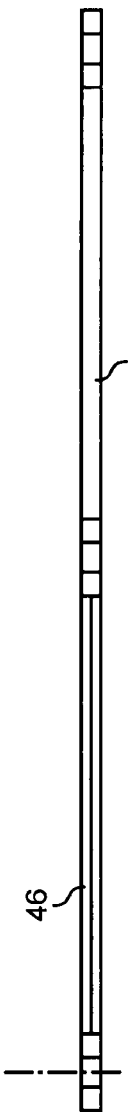
FIG. 27 is a side view of the transfer unit of FIG. 18.
Figure 28:
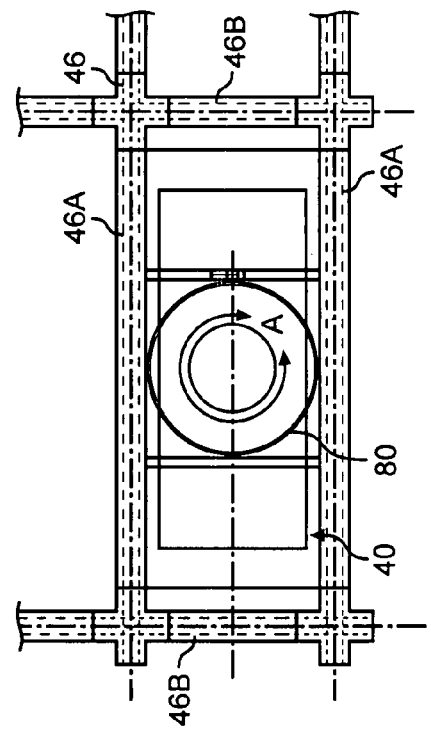
FIG. 28 is a top view similar to FIG. 18.

The transfer unit 40 is designed to raise and lower the storage units 28 of the invention. To accomplish this, two hoist motors 67 are mounted to the transfer unit 40. The outputs from these motors are connected through power splitters 65 to pairs of winding drums 66. Cables 69, as shown in FIG. 20, depend from the drums 66 to lower ends that are fixed to a lifting frame 90 that functions as a spreader beam to be in selectively locked engagement with an upper portion of one of the storage units 28 via corner locks 92. As the lifting frame 90 is lowered toward an underlying storage unit 28, by activation of the motors 67, the frame 90 will engage about the upper periphery of the storage unit 28, after which, the corner locks 72 are automatically tripped to engage the storage unit 28 such that the unit 28 can be elevated to a position immediately adjacent the transfer unit 40, as illustrated in FIG. 1. In this position, the transfer unit 40 can be moved along the track sections 46A and 46B so as to move the storage unit 28 above a desired storage cell 25 in the grid. Further, the storage unit 28 can be rotated via a trunnion 80, as shown in FIGS. 26-28. After the storage unit 28 is located above the desired cell 25, the storage unit 28 is lowered until it rests on the floor of the structure 20, on horizontal beams 26, or is seated on an underlying storage unit 28.

In the operation of the warehouse storage system of the first embodiment of the invention, a storage unit 28 is seated in a work area so that a customer may load items into or unload items from the storage unit 28. Preferably, the work area is located within the structure 20. Further, the work area is a plurality of an air-conditioned, enclosed rooms so that each customer can have a private area to load or unload a storage unit 28. Alternatively, the work area may be an open area, such as a drive-in area or dock area so that a truck or other vehicle can enter the work area. In another embodiment, the work area can be in an area other than the structure 20, such as at a customer's residence.

After a customer is done loading or unloading a storage unit 28 in the work area, the storage unit 28 is moved to the staging area 27. Once the storage unit 28 is seated in the staging area 27, an overhead transfer unit 40 maneuvers above the storage unit 28, and the lifting frame 90 of the overhead transfer unit 40 is lowered onto the storage unit 28. Once the lifting frame 90 is attached to the storage unit 28, an operator, preferably with a remote control device, begins to raise the lifting frame 90, and subsequently the storage unit 28, until they are directly beneath the body of the transfer unit 40. In this position, the storage unit 28 is moved to a predetermined cell 25 within the inner portion 21 of the building or structure 20. Thereafter, the operator lowers the lifting frame 90 and the storage unit 28 into a stored position.

Figure 2:
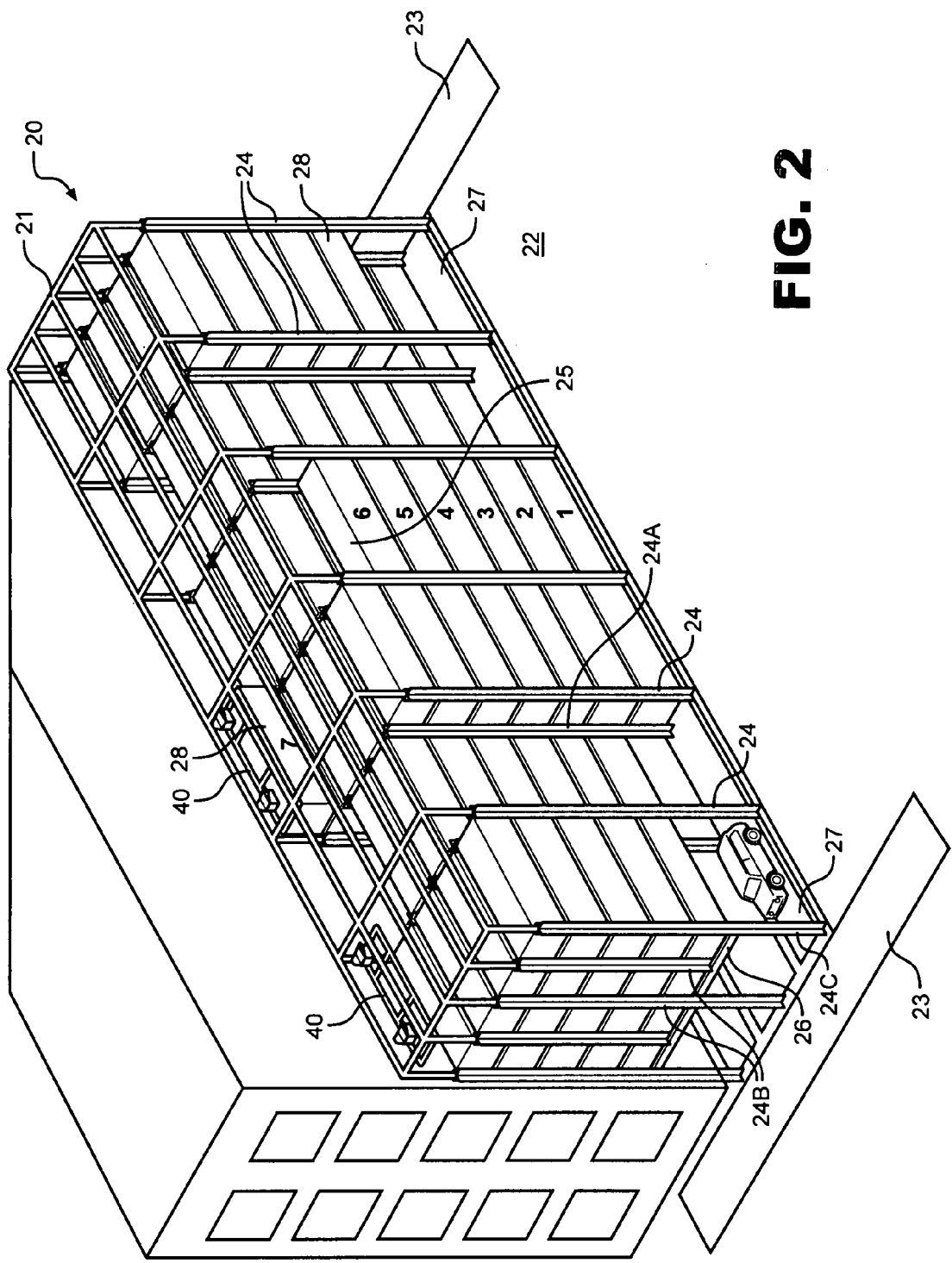
FIGS. 2-19 are perspective view of the warehouse storage facility of FIG. 1 further illustrating the retrieval process.
Figure 3:
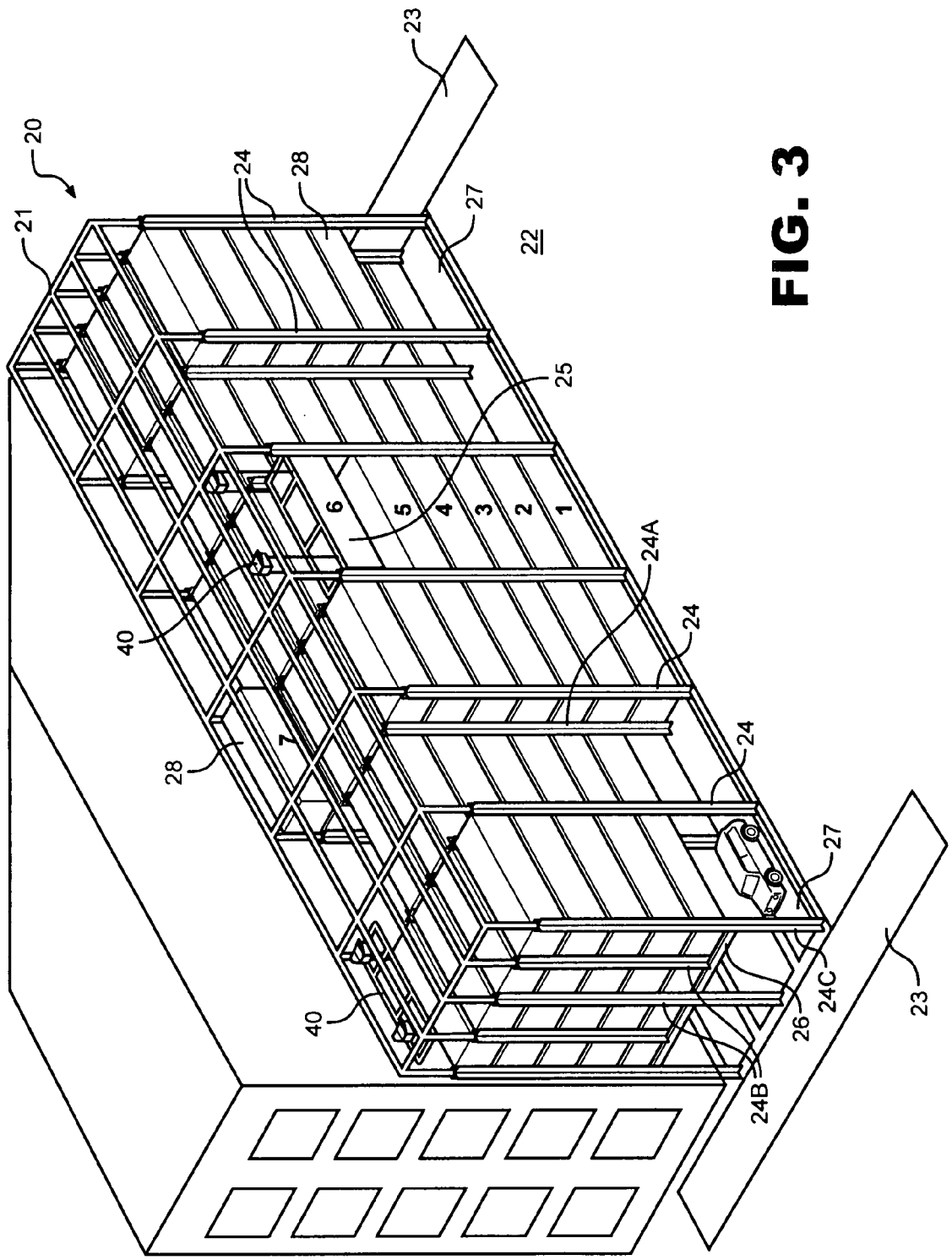
Figure 4:
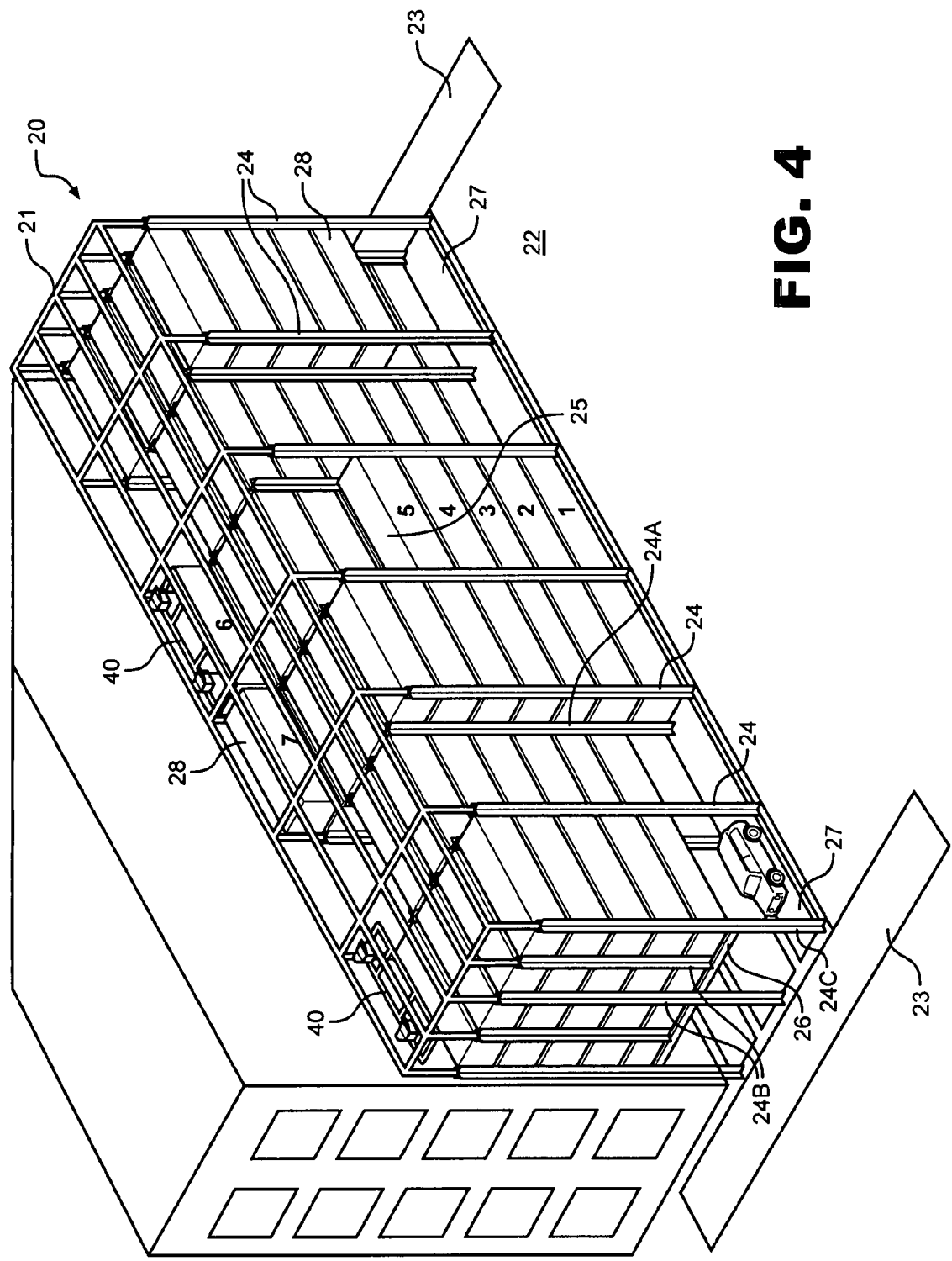
Figure 5:
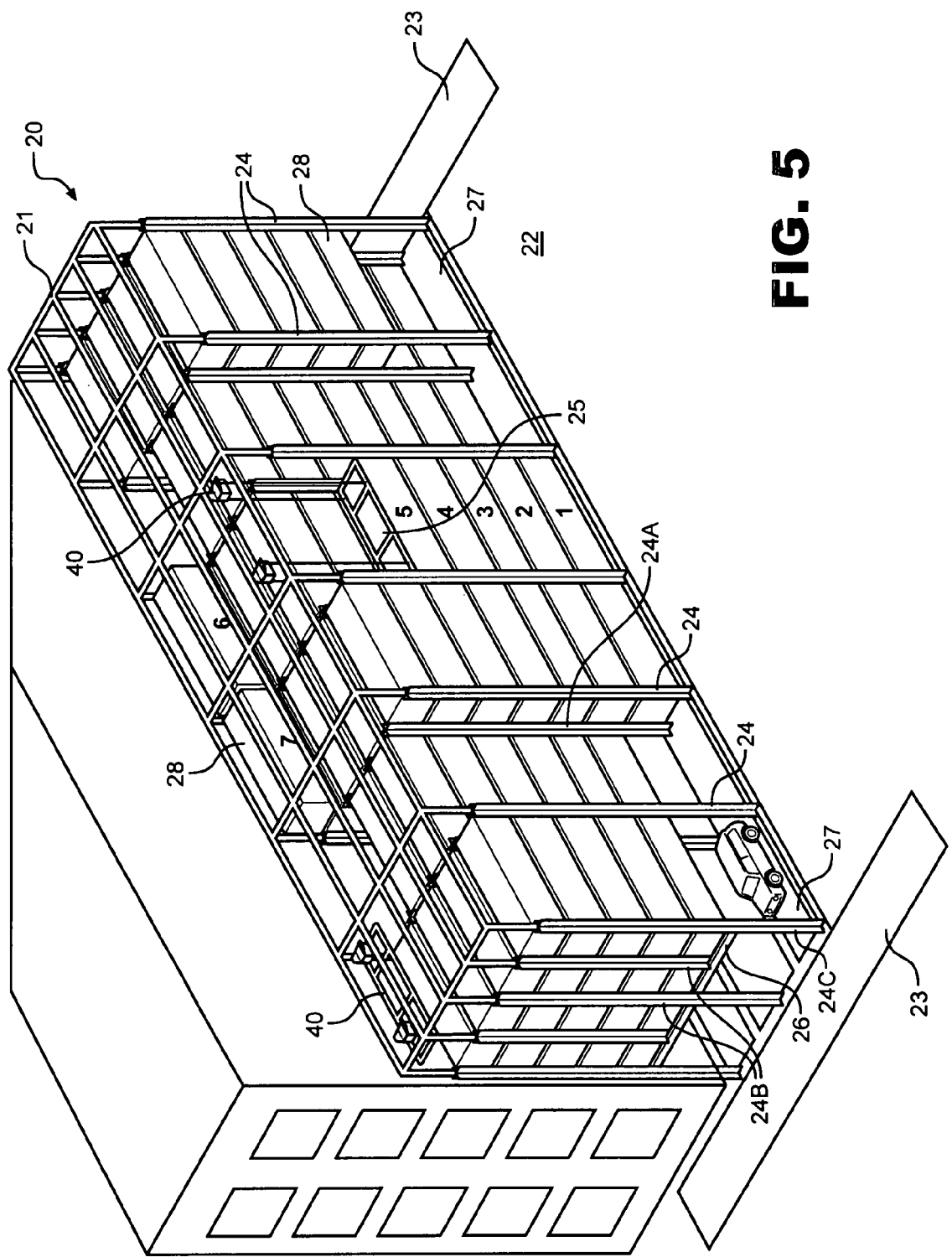
Figure 6:
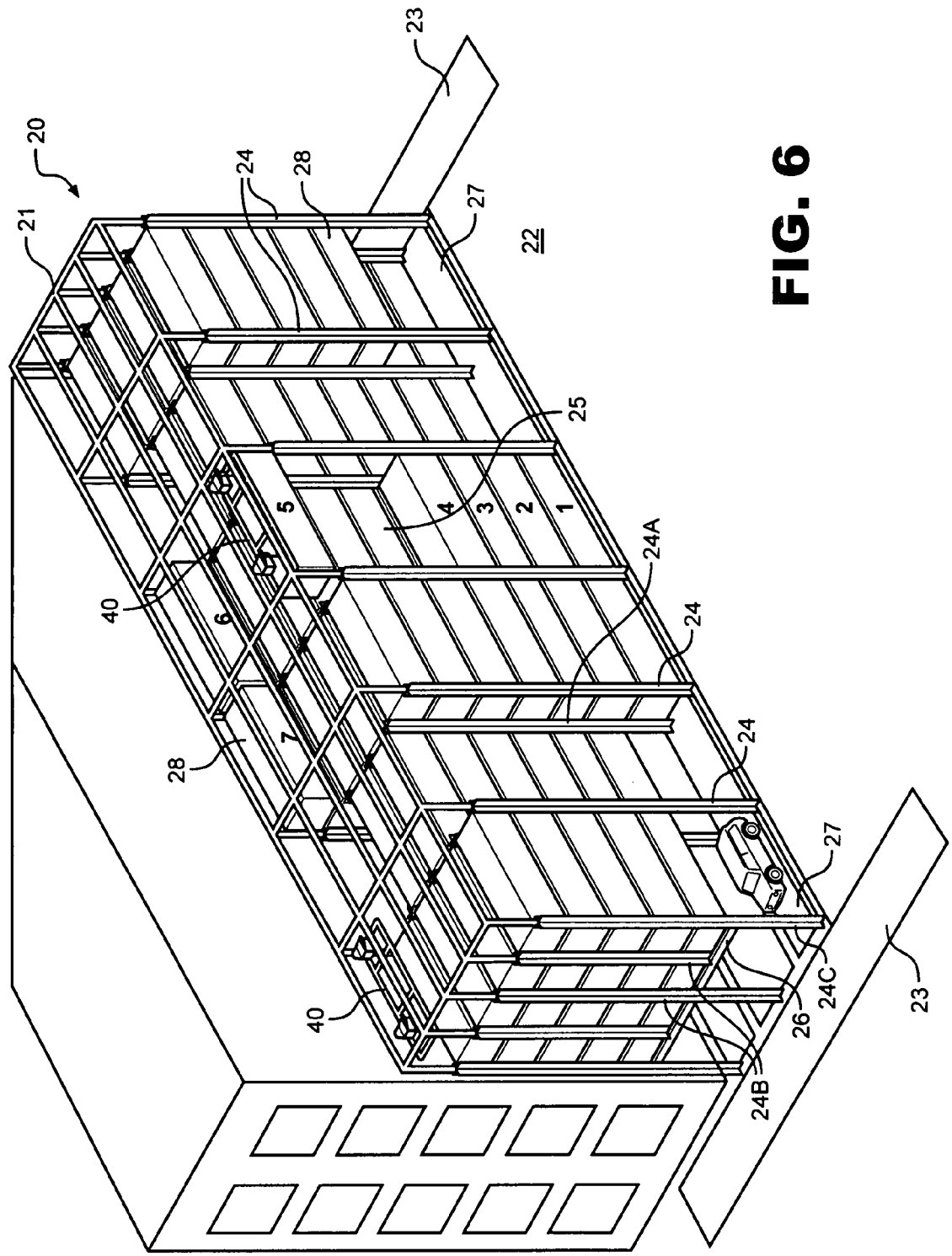
Figure 7:
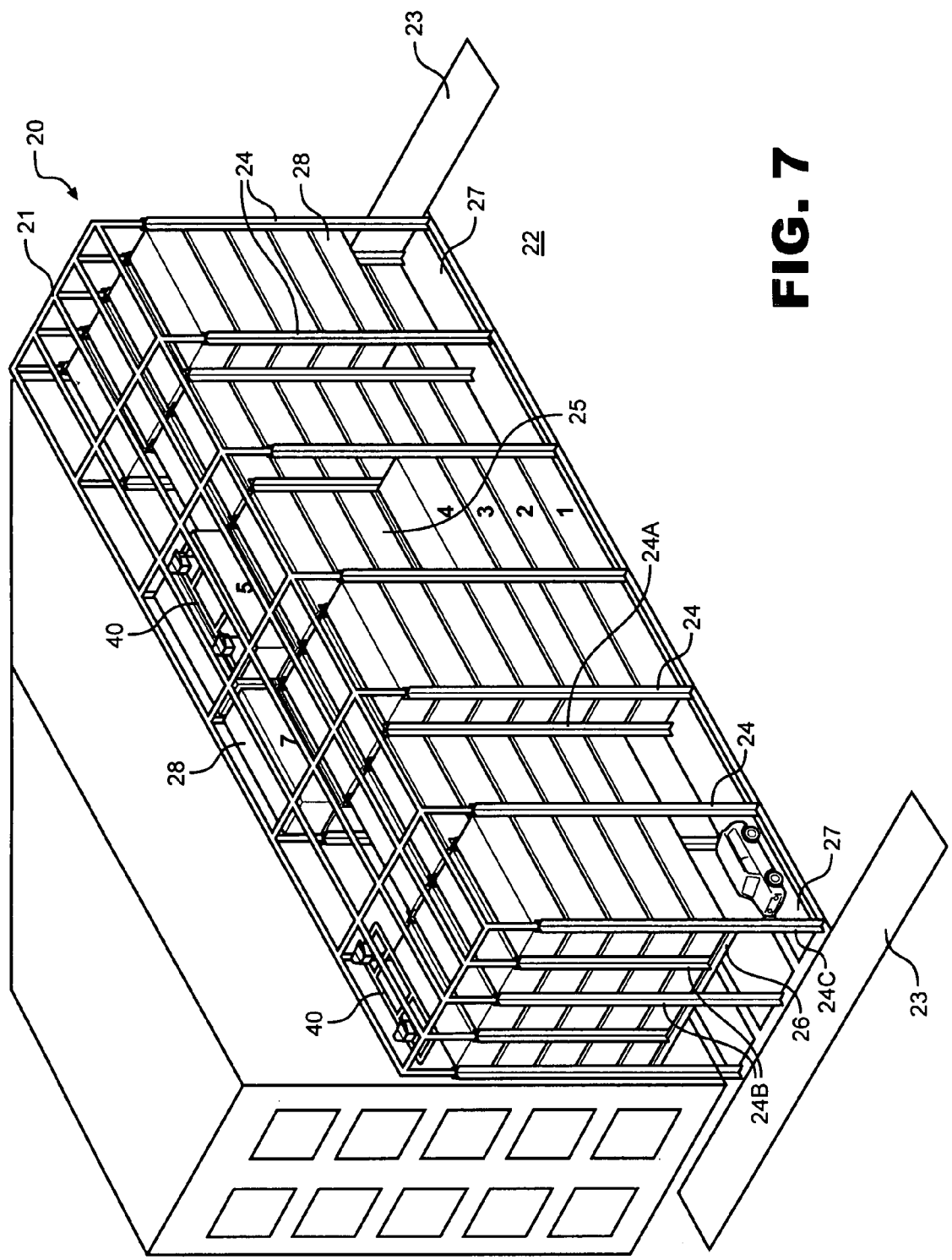
Figure 8:
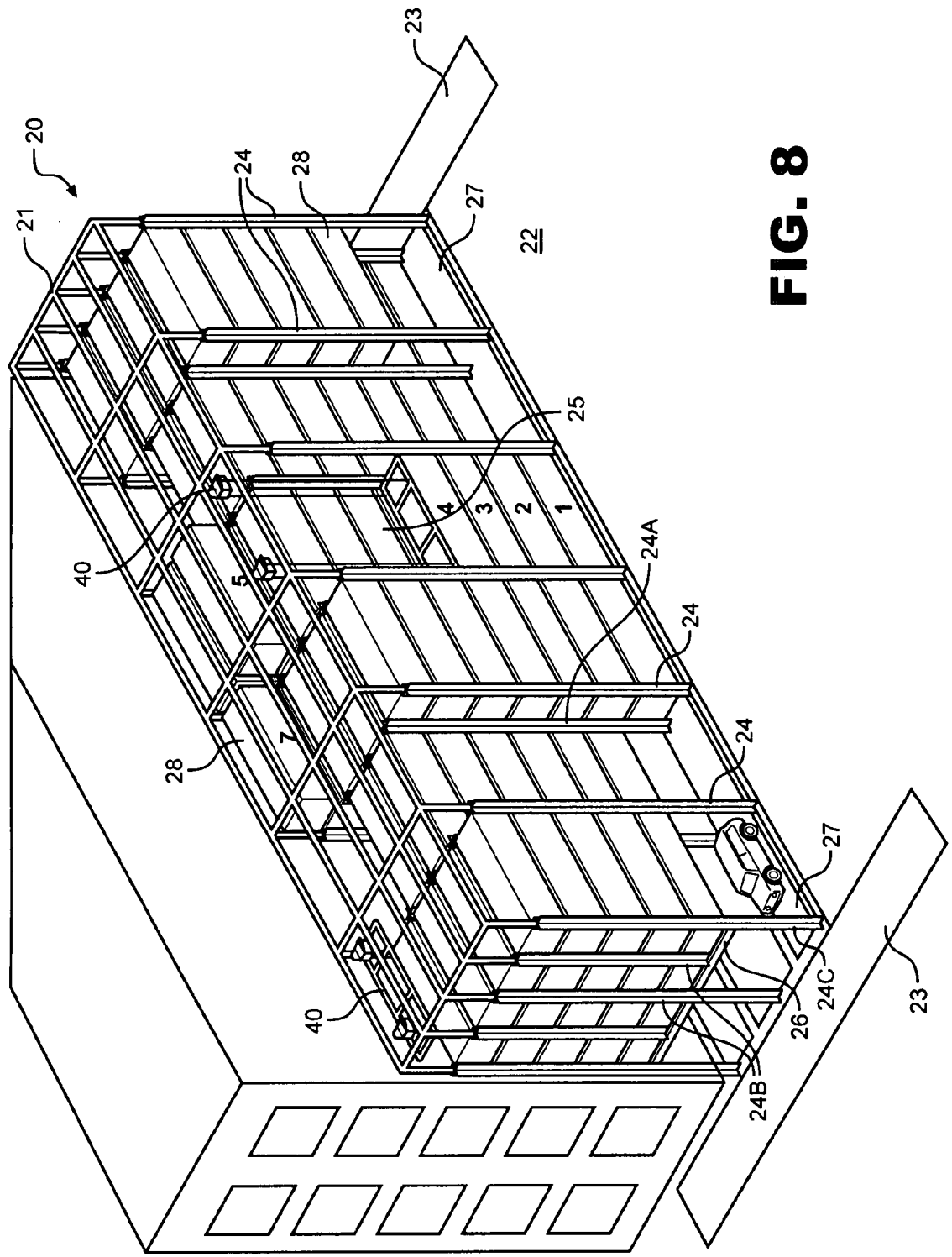
Figure 9:
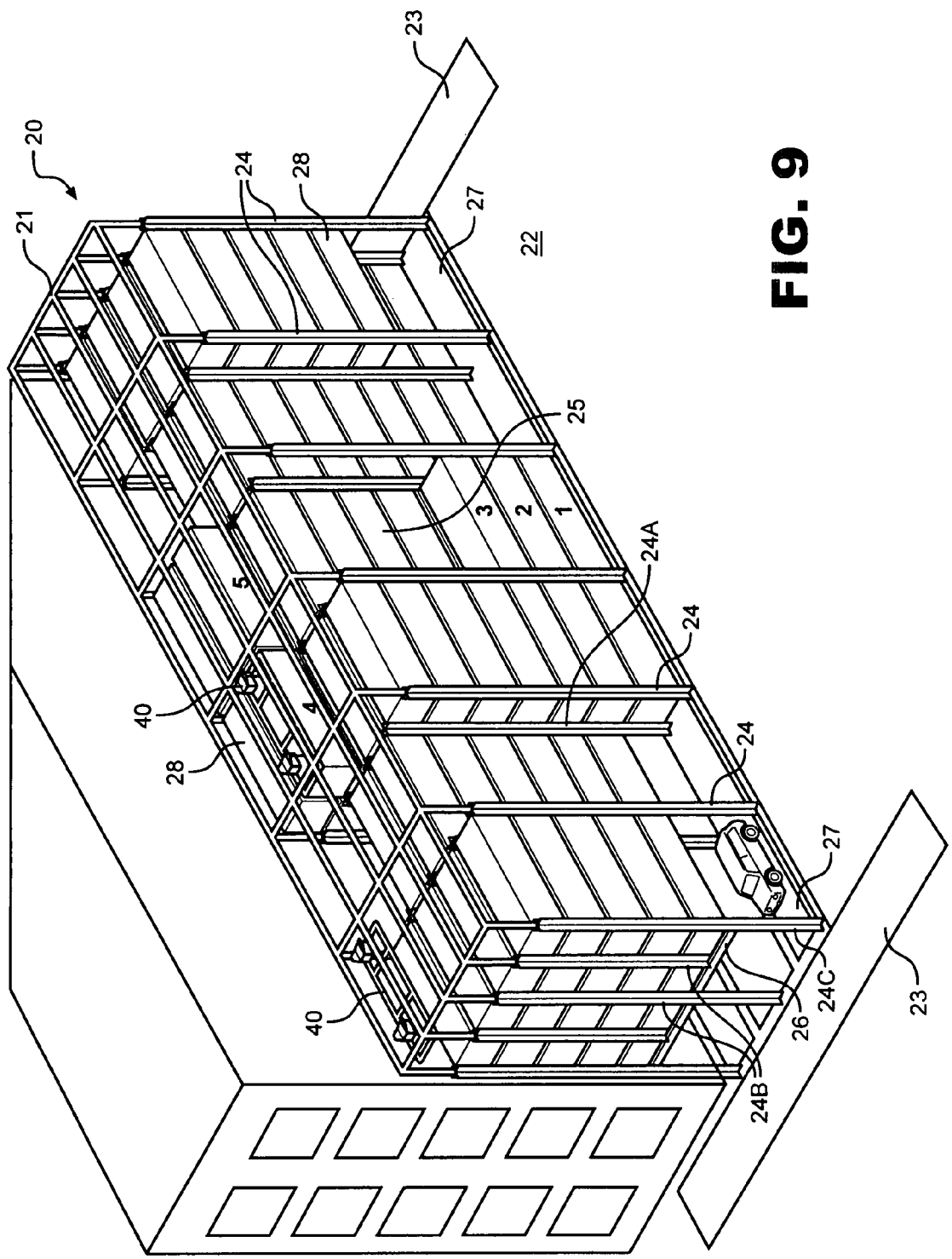
Figure 10:
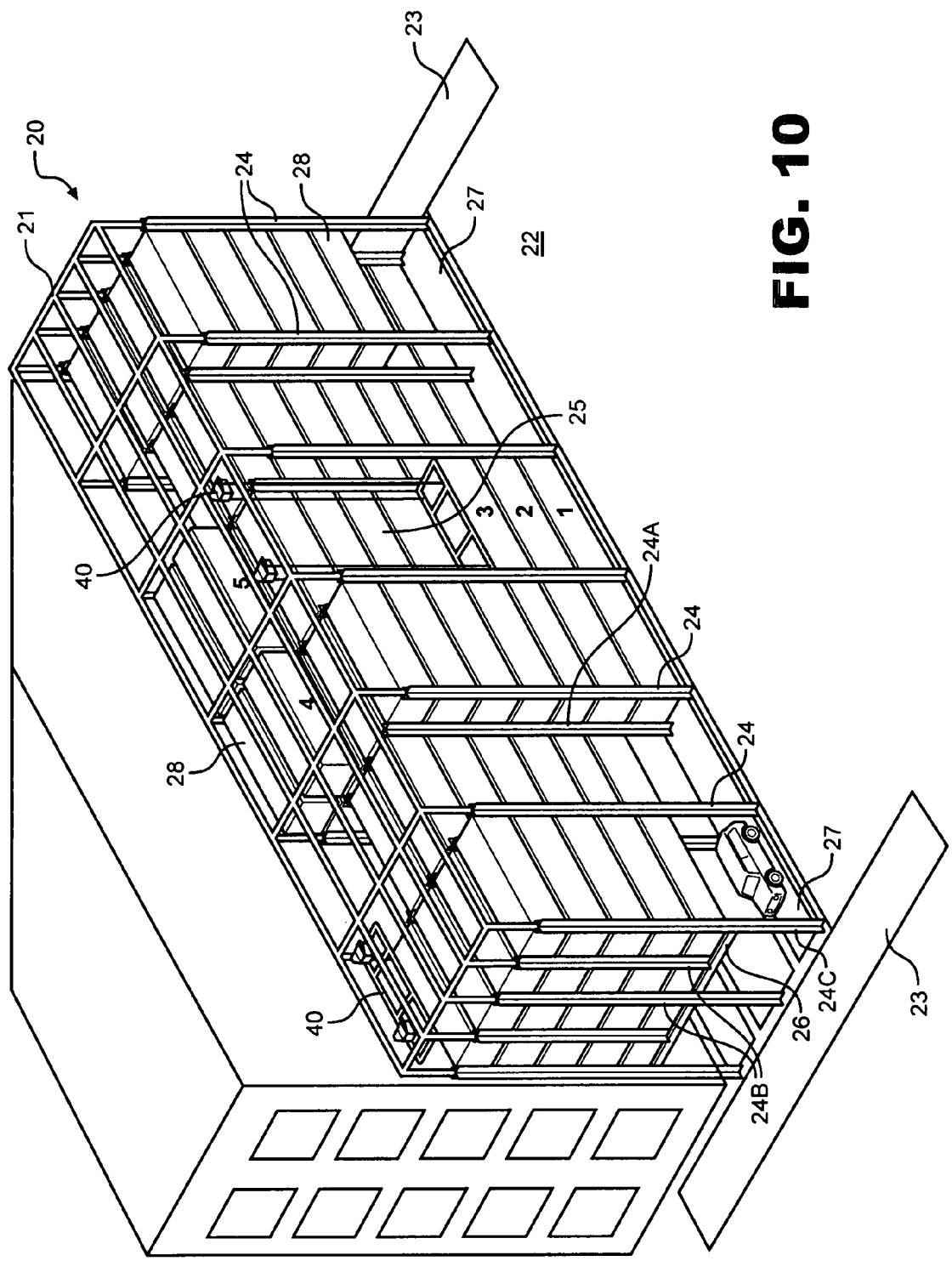
Figure 11:
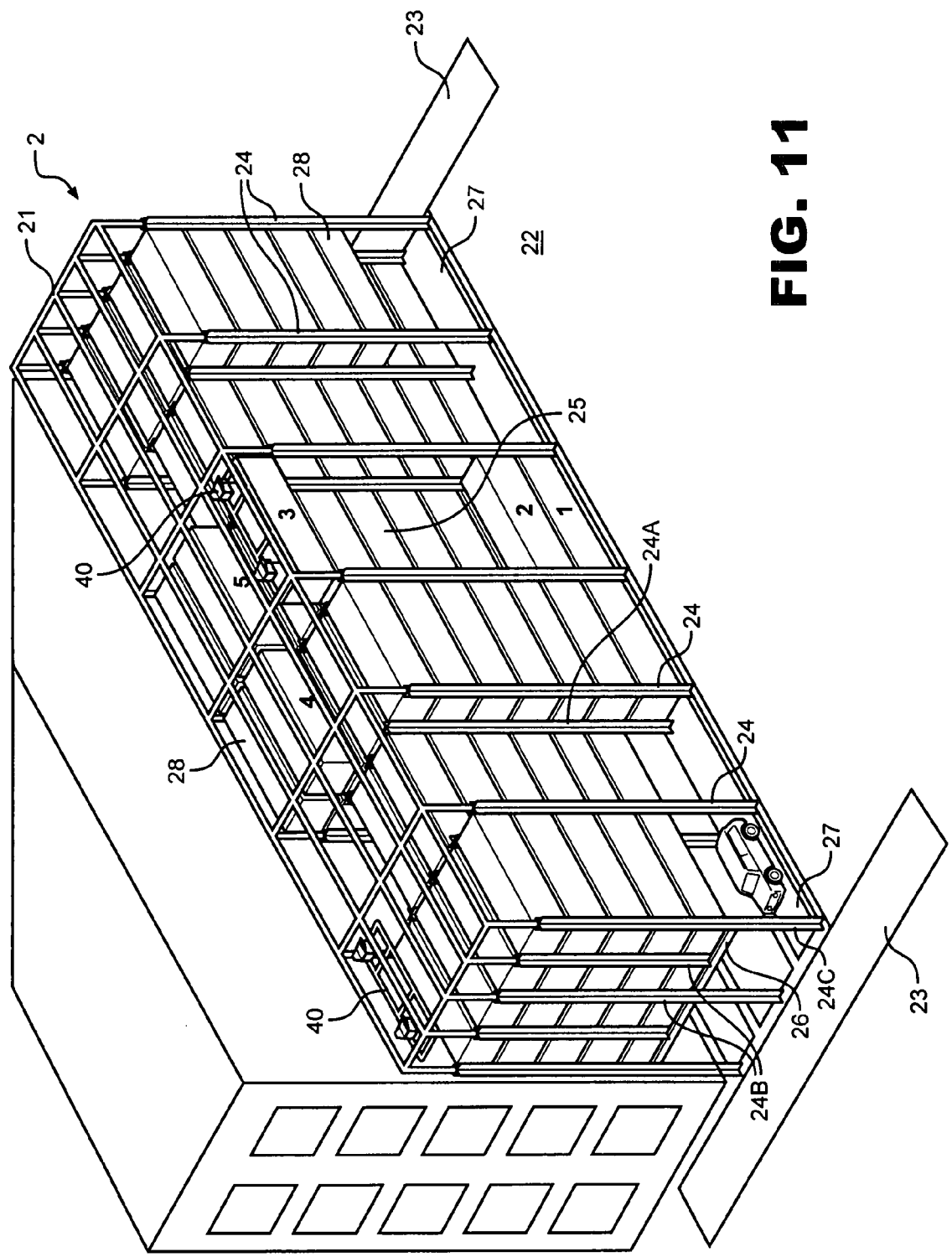
Figure 12:
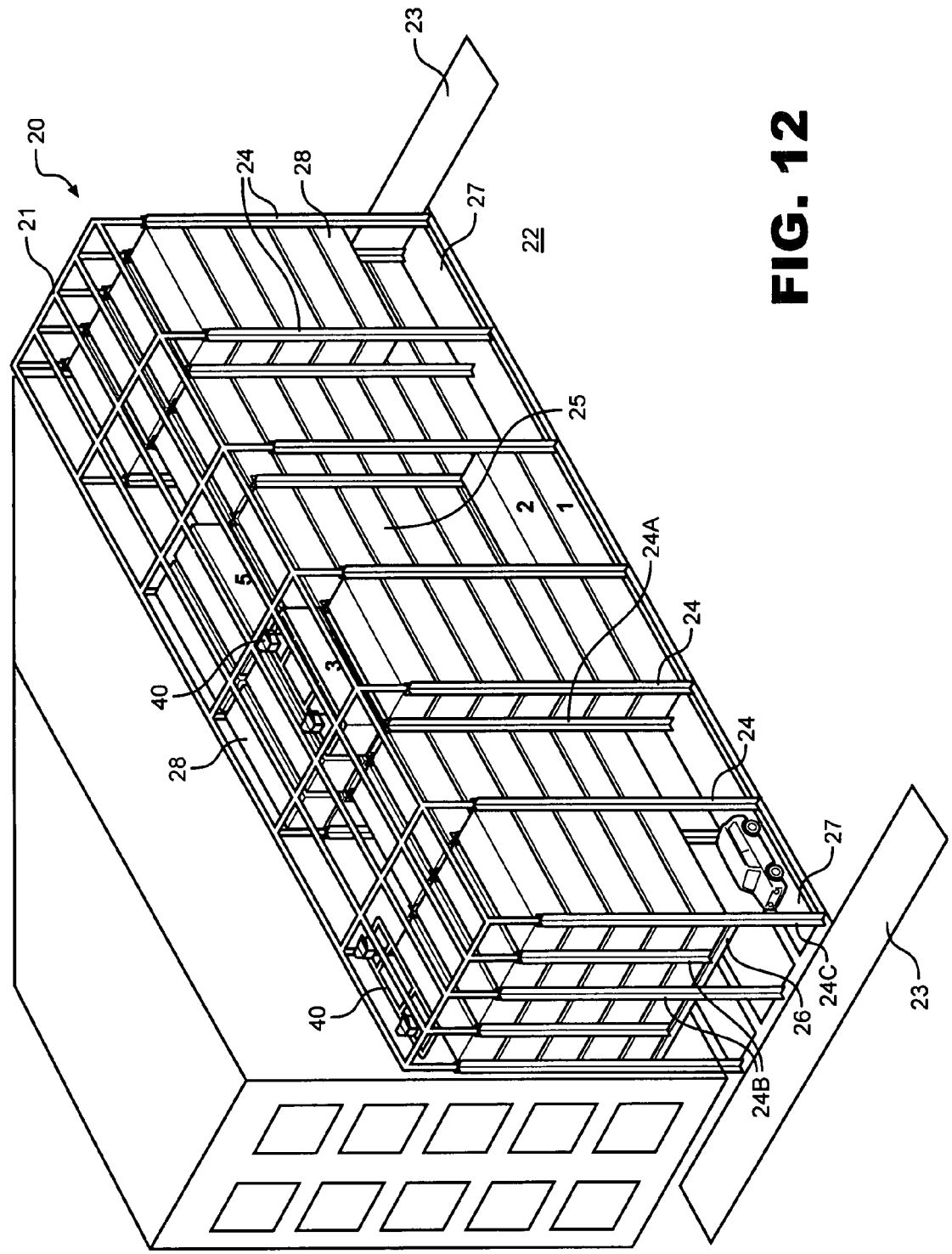
Figure 13:
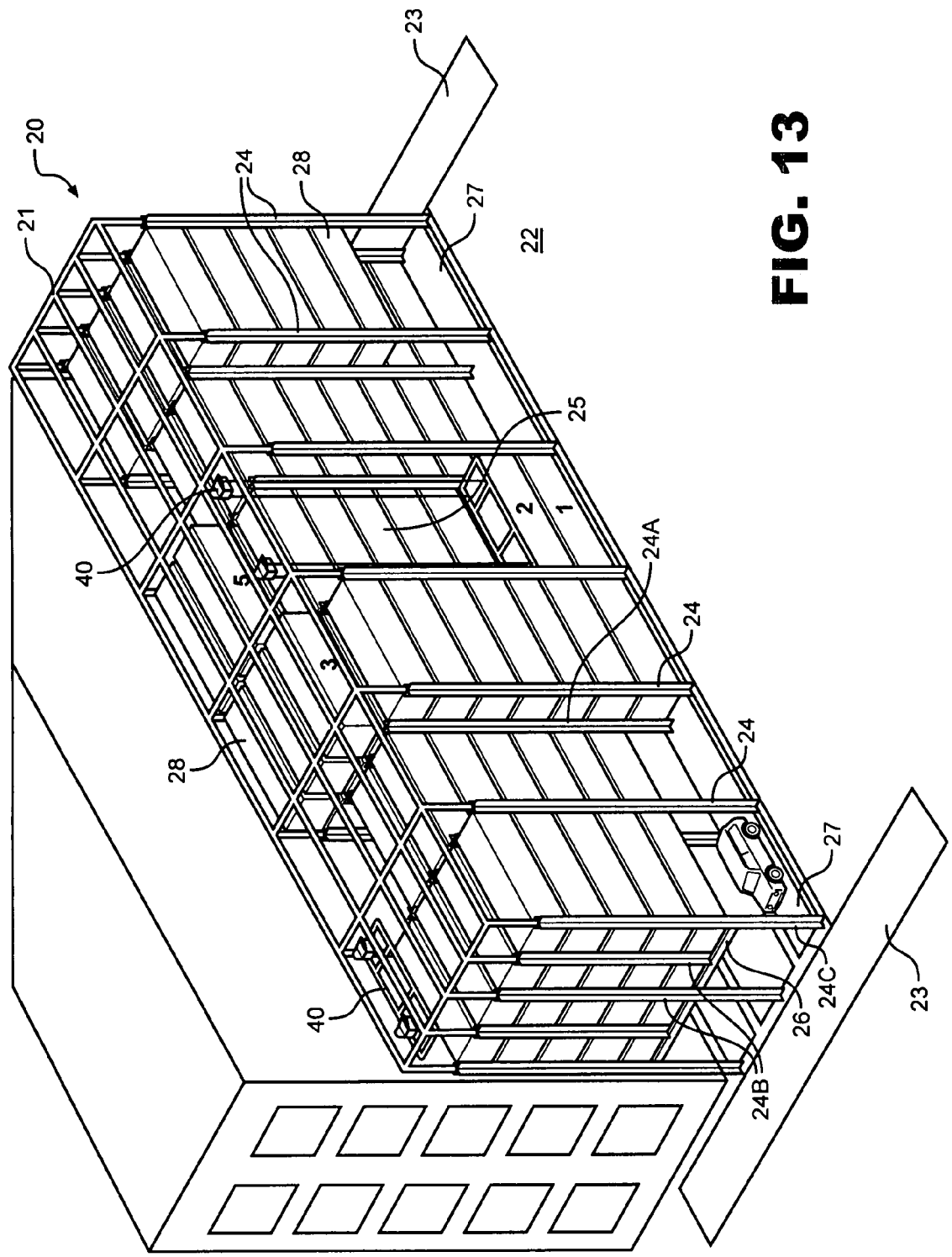
Figure 14:
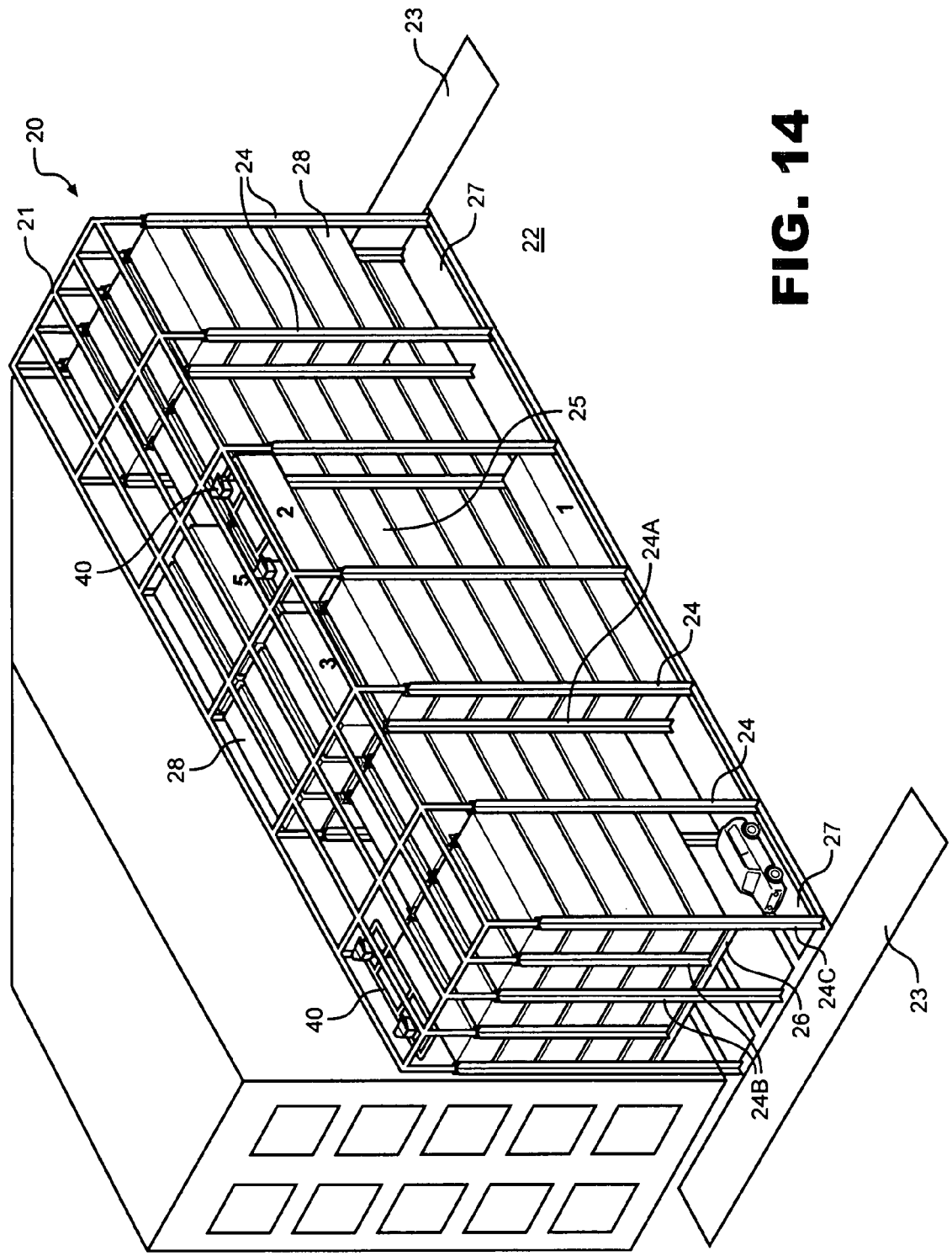
Figure 15:
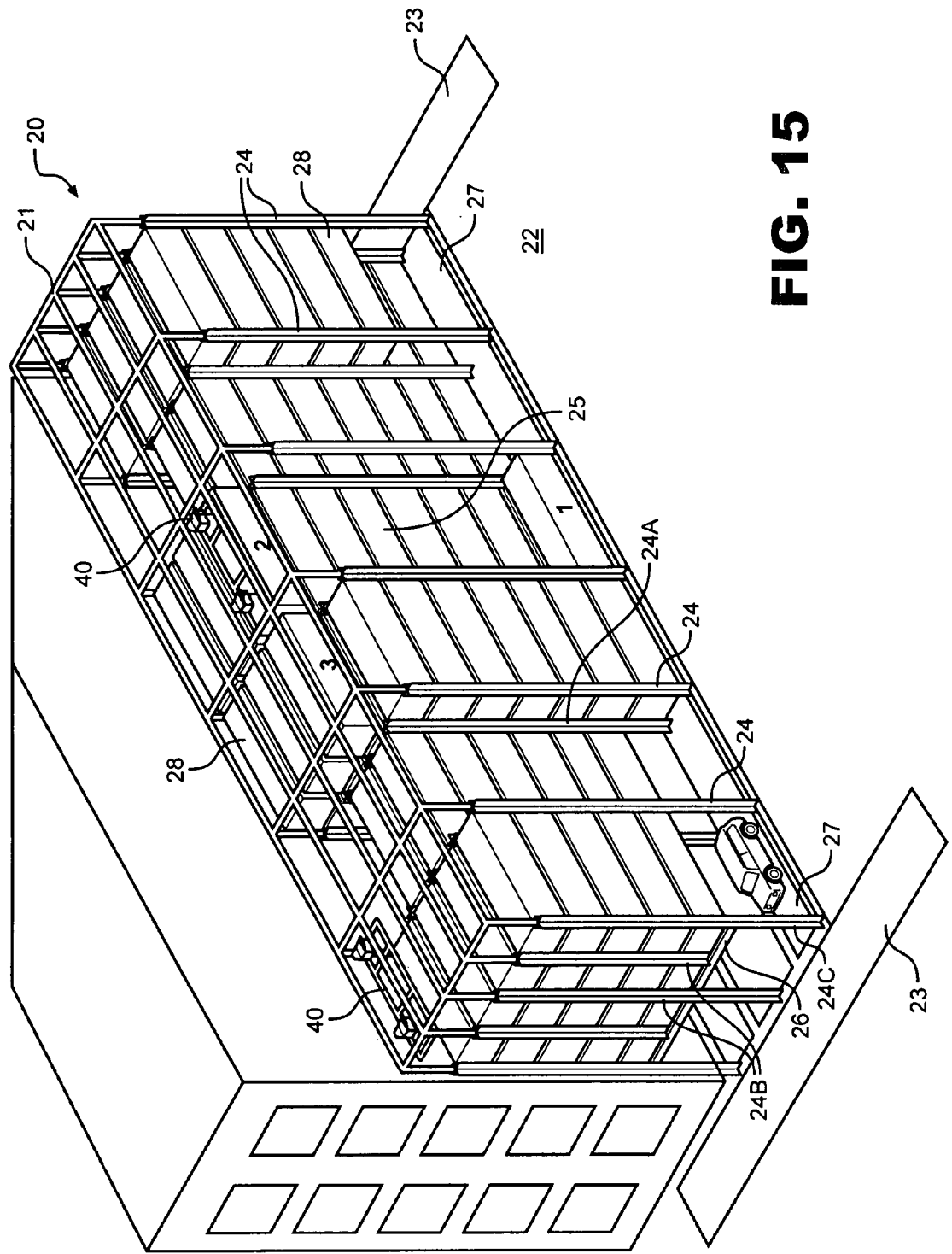
Figure 16:
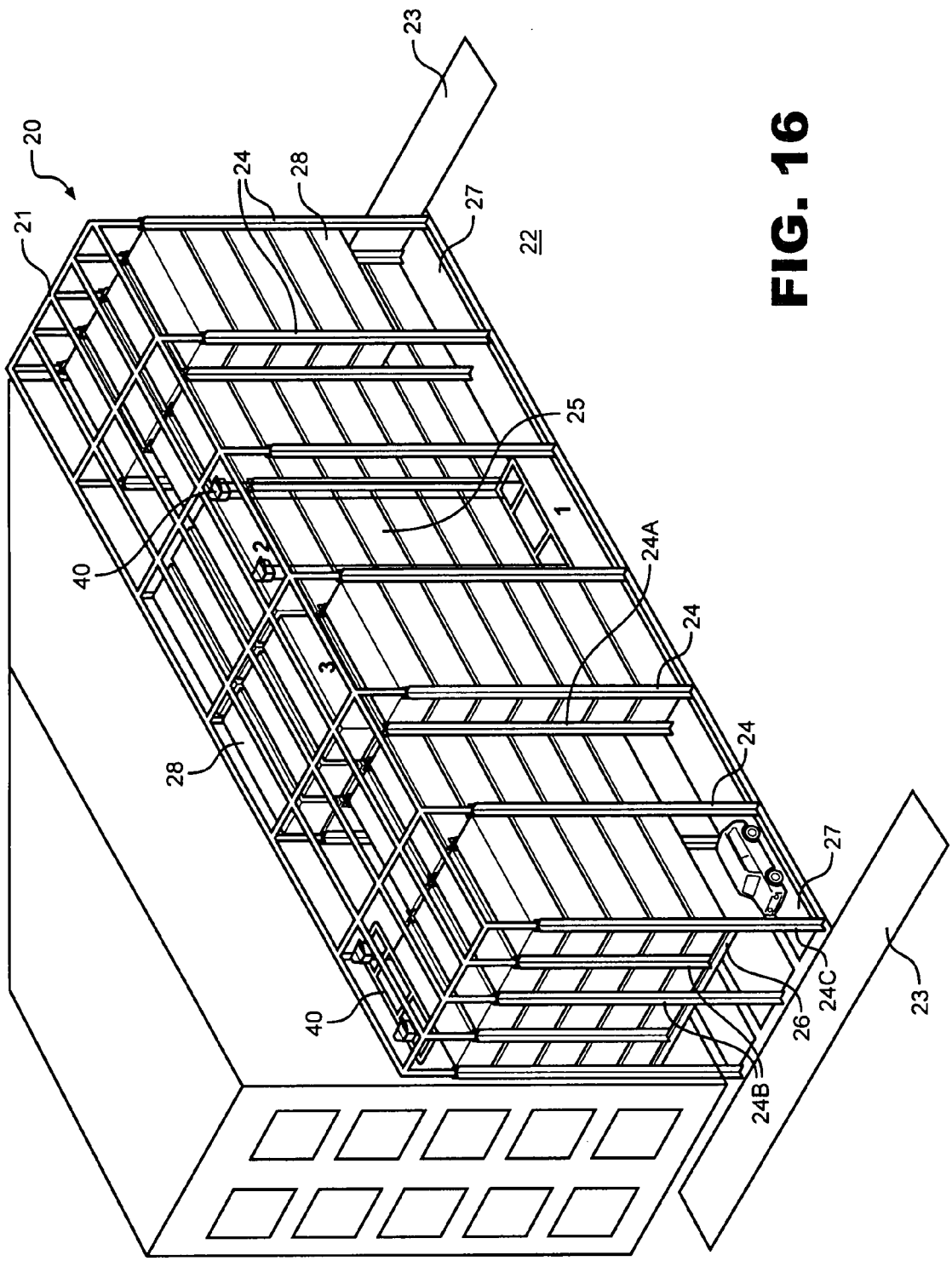
Figure 17:
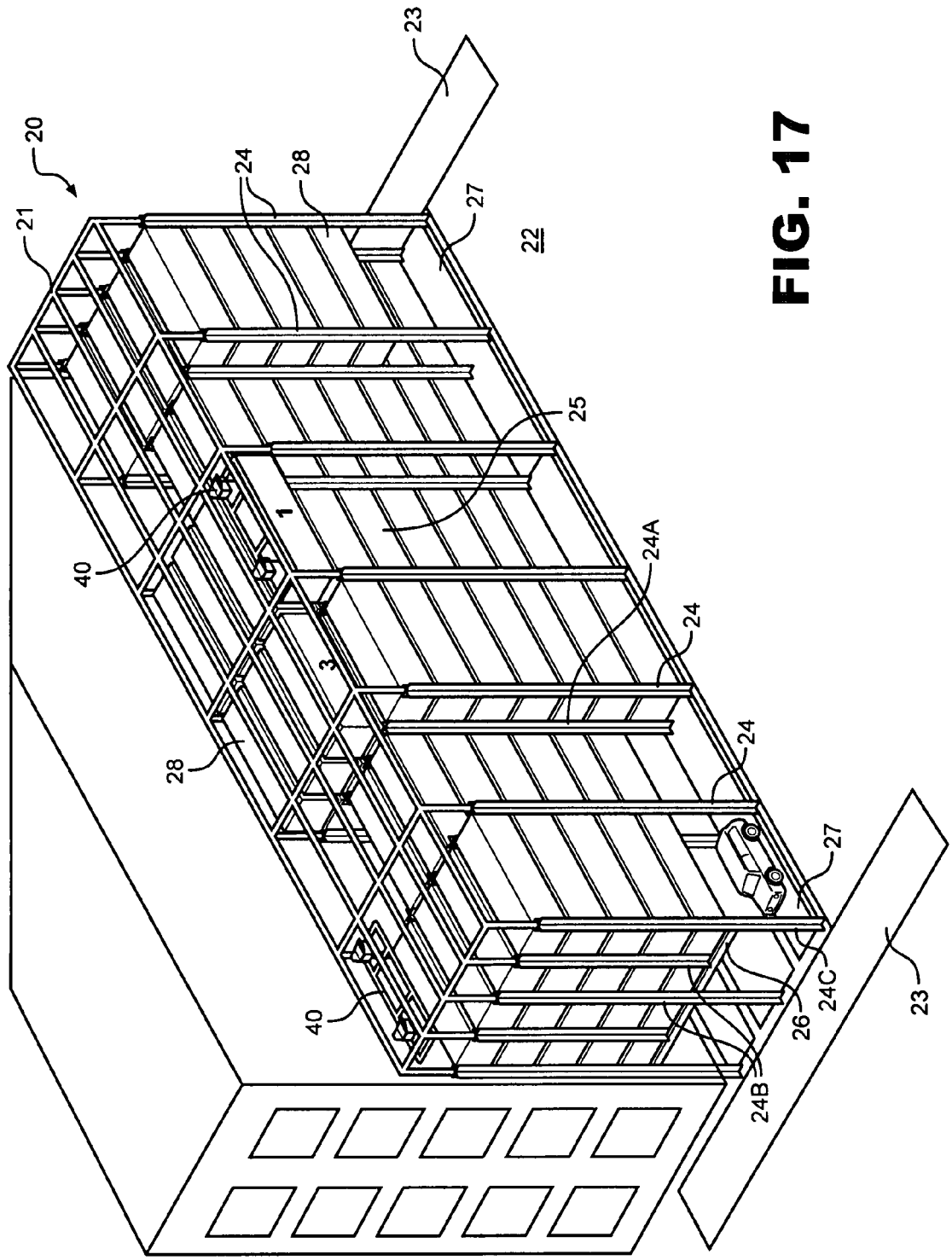
Figure 18:
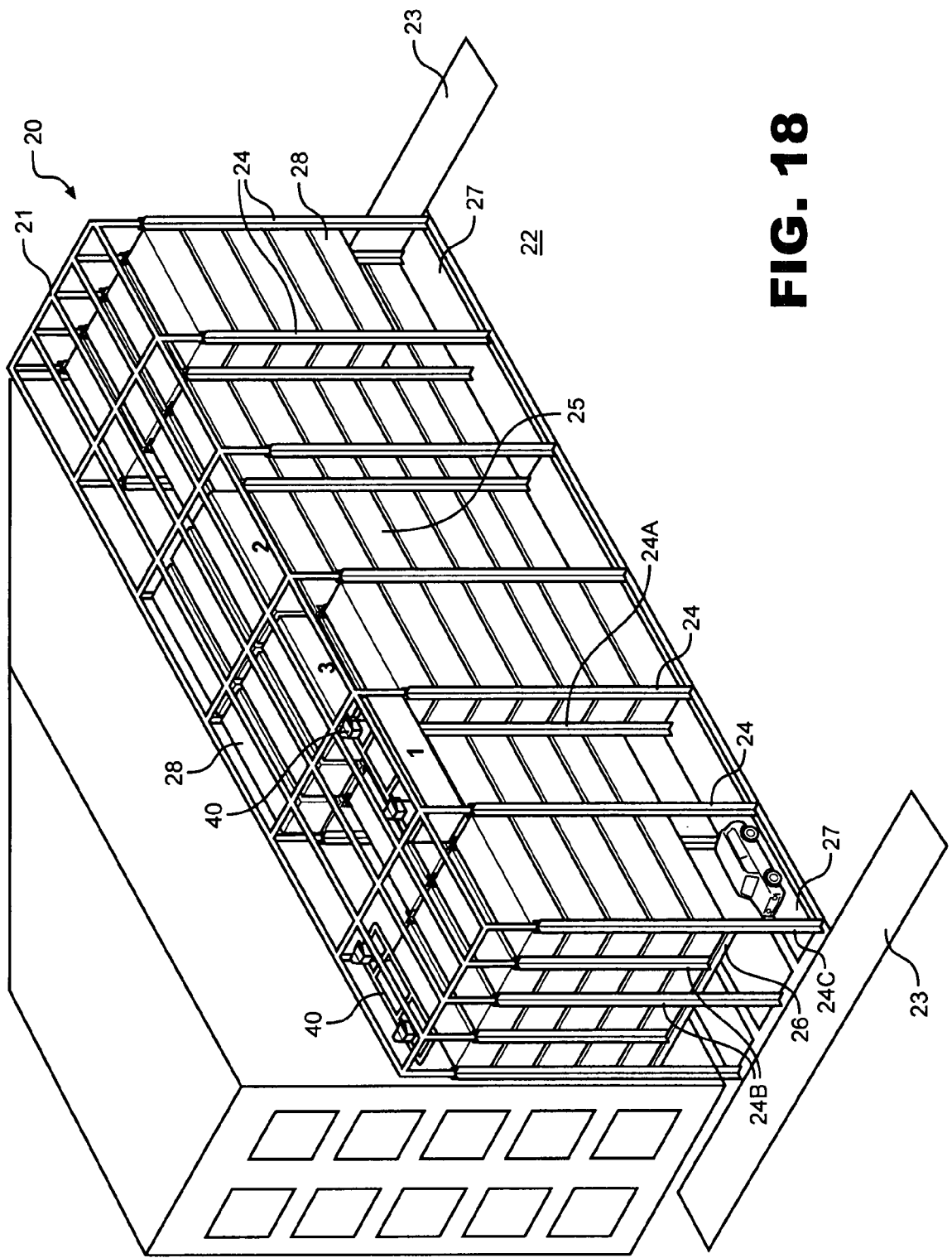
Figure 19:
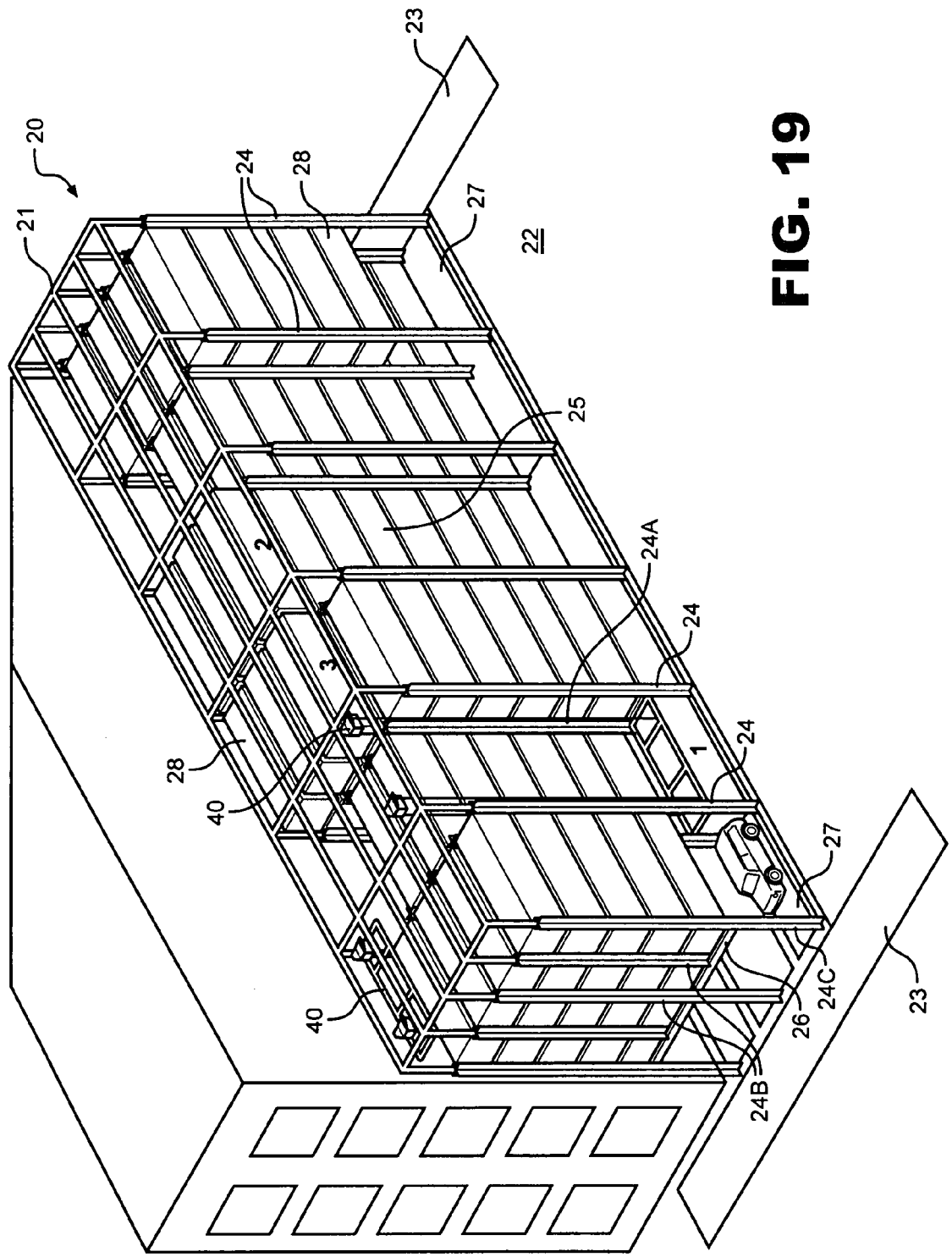

When it becomes necessary to retrieve an item from a storage unit 28 that is stored beneath a stack of storage units, as shown in FIG. 1, one of the transfer units 40 is moved over the appropriate cell 25. The lifting frame 90 is lowered until it automatically locks to an uppermost storage unit 28. The uppermost unit is elevated directly beneath the body of the transfer unit 40, after which the transfer unit 40 is moved along the empty rows and columns of the grid, as illustrated in FIG. 2. The storage unit 28 is then lowered into an empty cell, as shown in FIG. 3. This process is continued until the desired storage unit 28 is lifted from the storage cell, as shown in FIGS. 4-18. During the elevating and lowering of the storage unit 28, the storage unit 28 is positively guided by the columns 25A, 25B and 25C. Further, the storage unit 28 may be rotated via the trunnion 80 so that the opening of the storage unit 28 may face a desired direction. Alternatively, the storage unit 28 may be rotated via a turntable located on the floor of the work area. Lastly, the desired storage unit 28 is then lowered to the staging area 27, where it can be moved to a work area for loading or unloading.

As previously stated, the inner enclosed portion 21 of the warehouse structure 20 may be divided into storage cells, as shown in FIGS. 1-19. In an alternative embodiment, the inner portion 21 of the building 20 may be open, like a large empty warehouse with the structure of the storage units 128 permitting the vertical stacking arrangement shown in the drawings. In this respect, each storage unit 28 includes upper and lower rectangular frame components that are connected by corner vertical struts. The frames are formed of heavy steel tubing or the like that will permit the units to be stable when stacked one on another. To provide for further stability, the upper and lower corners of the storage units 28 are provided with mating male and female couplings such that the storage units 28 cannot shift relative to another.

The system of the present invention can be operated by an operator or operators at the facility, either manually or through the use of computers. Alternatively, the system can be controlled automatically. By way of example, a customer, when contracting for storage, may be given a personal code or a bar coded card that may be entered into a control terminal placed at an accessible site adjacent the area where the storage units 28 are elevated from the staging area 27. The control terminal is connected to a computer system that verifies the number of the access or bar code. At the time of verification, the computer signals one of the transfer units 40 having a correct size of storage unit 28 available to move to the staging area 27 and lower the storage unit 28. After the customer is done loading or unloading the storage unit 28 in the work area, the hoists are subsequently automatically activated to raise the storage unit 28 from the staging area 27 to a position immediately below the transfer unit 40. The transfer unit 40 receives storage position information from the computer and automatically moves to a predetermined area or cell 25 within the storage facility and then lowers the storage unit 28 into the predetermined storage position.

Similarly, when a customer wants to retrieve items from a storage unit 28, by entering his or her code number or by use of the bar coded card, the controller communicates with the computer. The computer communicates with one or more of the transfer units 40, and the transfer unit 40 moves to the appropriate cell 25. Further, the transfer unit 40 may first move one or more storage units 28 in order to obtain access to the desired storage unit 28. After the desired storage unit 28 is secured to the lifting frame 90, the storage unit 28 is raised to beneath the transfer unit 40. Then, the transfer unit 40 moves to a position above the staging area 27 and lowers the storage unit 28.

Such an automatic system can incorporate the use of personal PIN numbers in combination with the access codes and/or bar coded cards to provide additional security. The automated system not only provides for secured storage and access to the storage unit, but also permits items to be stored or retrieved from storage at any time, thus making the system completely compatible to the individual customers.

Further, in another alternative embodiment, the warehouse storage system of the present invention also includes means for identifying each storage unit 28. Such identification means may include a radio frequency identification system or a bar code system. For example, each storage unit 28 includes a radio frequency identification tag, and the warehouse structure 20 is equipped with various radio frequency readers.

Accordingly, the readers are able to obtain data from the identification tags regarding the position of each storage unit 28 in the warehouse 20. The readers then transfer this information to the computers for analysis and storage.

The foregoing description of the present invention has been presented to illustrate the principles of the invention and not to limit the invention to the particular embodiments illustrated. It is intended that the scope of the invention be defined by all of the embodiments encompassed within the following claims and their equivalents.

We claim:

1. An overhead warehouse storage system for selectively elevating storage units, storing the storage units within a storage facility and retrieving the storage units from the storage facility, the storage system comprising:
    a warehouse storage structure including a first storage section for storing a plurality of storage units and at least one second staging section adjacent said first storage section for placement of said storage units to permit loading and unloading thereof, said first storage section including spaced columns defining a plurality of vertically oriented storage cells which are arranged in closely spaced side-by-side relationship with one another and which are open and free of obstructions from a bottom to an open top of each cell, each of said storage cells being of a size to guidingly receive a plurality of storage units therein that are stacked one upon another, said second staging section being spaced from said storage cells;
    an overhead track system including pairs of stationary spaced and parallel tracks that extend and intersect with one another in an X-Y plane above said vertically oriented storage cells of said first storage section;
    at least one powered transfer unit mounted to said overhead track system, said transfer unit including drive means to move said at least one transfer unit transversely along said pairs of spaced and parallel and intersecting tracks in the X-Y plane above said first storage section of said storage structure, each of said storage units defining a container for storing items therein, said at least one transfer unit including a hoist device for selectively engaging, elevating and lowering said storage units, each of said containers being constructed to permit items to be loaded into and removed therefrom; and
    wherein a plurality of said storage cells are configured such that storage units may be interchangeably placed therein.

2. The overhead warehouse storage system of claim 1, wherein said at least one second staging section of said storage structure is at least partially spaced beneath said first storage section, and wherein a plurality of said storage cells include lower horizontal supports spaced vertically above said at least one second staging section for supporting said storage units therein.

3. The overhead warehouse storage system of claim 1 wherein each of said vertical storage cells is defined by a plurality of spaced and vertically parallel columns which include guide surfaces for guiding said storage units as the storage units are raised and lowered within said storage cells.

4. The overhead warehouse storage system of claim 3 including a plurality of second staging sections spaced from said first storage section.

5. The overhead warehouse storage system of claim 1 wherein at least one of said vertical storage cells extends upwardly from at least one horizontal support beam spaced a distance above a ground surface of the warehouse storage structure, and said at least one horizontal support beam supports said storage units when said storage units are stored in said at least one of said vertical storage cells.

6. The overhead warehouse storage system of claim 5 wherein the at least one second staging section is located below said at least one horizontal support beam along the ground surface of the warehouse storage structure.

7. The overhead warehouse storage system of claim 1 wherein at least a portion of said first storage section is positioned above said at least one second staging section of said warehouse storage structure, and at least one of said storage cells extends upwardly from at least one horizontal support beam spaced a distance above said at least one second staging section, and said at least one horizontal support beam supports said storage units above said at least one second staging section when said storage units are stored in said at least one of said storage cells.

8. The overhead warehouse storage system of claim 1 wherein each of said storage units includes upper and lower frame members connected by vertical frame members.

9. The overhead warehouse storage system of claim 8 wherein said frame of each of said storage units is generally open at at least one end thereof to thereby permit items to be loaded into or removed from said storage units.

10. The overhead warehouse storage system of claim 1 wherein the pairs of spaced and parallel tracks extend in at least one of an X or Y direction over said second section of said storage structure.

11. The overhead warehouse storage system of claim 1 wherein said plurality of storage units includes storage units of different sizes for accommodating items of different sizes, and wherein said plurality of storage cells are of different sizes so as to cooperatively receive the different sizes of storage units.

12. The overhead warehouse storage system of claim 1 further including controlling means for automatically electronically controlling the storage and/or the retrieval of said storage units relative to said plurality of storage cells of said first section of said storage structure, and said controlling means including electronic means for identifying a storage unit and activating means for activating said at least one transfer unit to appropriately store or retrieve an identified storage unit from one of said storage cells.

13. A method for storing items in a storage structure having a first storage section in which a plurality of storage units may be vertically stacked one upon another within a plurality of vertically and continuously open storage cells which are closely spaced relative to one another and a second staging section adjacent to but spaced from the first storage section and wherein the storage units are selectively raised, lowered and maneuvered within the storage structure using at least one transfer vehicle that is movable along an overhead grid track system including pairs of stationary spaced and parallel tracks that extend and intersect with one another in an X-Y plane above said plurality of vertically and continuously open storage cells, and which includes a hoist assembly including means for engaging one of the storage units, the method including the steps of:
    A. Moving the at least one transfer unit along the overhead grid track system so as to be within the second staging section of the storage structure and thereafter lowering a storage unit carried thereby onto a support surface of the second staging section;
    B. Moving items into or from the lowered storage unit;
    C. Elevating the storage unit so as to be closely spaced to the at least one transfer vehicle;

D. Maneuvering the at least one transfer vehicle along the overhead grid track system so as to be above a predetermined storage cell in the first storage section of the storage structure;
E. Lowering the storage unit being stored by lowering the storage unit into the predetermined storage cell until the storage units rests in contact upon another storage unit or on a horizontal support beam and thereafter releasing the storage unit from the at least one transfer vehicle;
F. Retrieving items within the storage unit by moving the at least one transfer vehicle along the overhead grid track system and above the predetermined storage cell and lowering the hoist assembly to engage the storage unit;
G. Elevating the engaged storage unit above the vertical storage cell and thereafter moving the at least one transfer vehicle along the overhead grid track system to the second staging section of the storage structure; and
H. Lowering the storage unit onto the second staging section of the storage structure and thereafter removing items from the storage unit.

14. The method of claim 13 further including an additional step of positively guiding the storage unit as the storage unit is raised and lowered within the predetermined storage cell within the first storage section.

15. The method of claim 13 further including additional steps of electronically accessing an electronic control device for controlling movement of the at least one transfer vehicle and electronically requesting the retrieval of a predetermined storage unit, whereupon the receipt of a retrieval request, the at least one transfer vehicle automatically retrieves the requested storage unit and transfers the retrieved storage unit to a requested location.

16. The method of claim 15 further including additional steps of placing an identifying means for electronically identifying each of the storage units on the storage units and providing remote readers for communicating with the identifying means whereby the location of each storage unit is electronically determined.

* * * * *